(12) United States Patent
Khoshnevisan et al.

(10) Patent No.: US 12,261,795 B2
(45) Date of Patent: Mar. 25, 2025

(54) REFERENCE SIGNAL PATTERNS FOR BEAM MANAGEMENT

(71) Applicant: QUALCOMM Incorporated, San Diego, CA (US)

(72) Inventors: Mostafa Khoshnevisan, San Diego, CA (US); Yitao Chen, San Diego, CA (US); Xiaoxia Zhang, San Diego, CA (US); Jing Sun, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 215 days.

(21) Appl. No.: 17/246,276

(22) Filed: Apr. 30, 2021

(65) Prior Publication Data

US 2022/0353038 A1 Nov. 3, 2022

(51) Int. Cl.
*H04L 5/00* (2006.01)
*H04W 72/044* (2023.01)
*H04W 72/23* (2023.01)

(52) U.S. Cl.
CPC ......... *H04L 5/0051* (2013.01); *H04W 72/044* (2013.01); *H04W 72/23* (2023.01)

(58) Field of Classification Search
None
See application file for complete search history.

(56) References Cited

U.S. PATENT DOCUMENTS

| | | | | |
|---|---|---|---|---|
| 2018/0206132 A1* | 7/2018 | Guo | ................. | H04W 72/0473 |
| 2019/0103949 A1* | 4/2019 | Harrison | .............. | H04B 7/0456 |
| 2019/0104477 A1* | 4/2019 | MolavianJazi | ....... | H04W 52/10 |
| 2019/0149379 A1* | 5/2019 | Xiong | ..................... | H04L 5/006 370/329 |
| 2019/0281588 A1* | 9/2019 | Zhang | .................. | H04B 7/0617 |
| 2019/0356445 A1* | 11/2019 | Manolakos | .......... | H04B 7/0805 |
| 2020/0052853 A1* | 2/2020 | Qin | ....................... | H04L 5/0094 |
| 2020/0107352 A1* | 4/2020 | Tsai | ..................... | H04B 7/0617 |

(Continued)

FOREIGN PATENT DOCUMENTS

| | | | | |
|---|---|---|---|---|
| CA | 3207332 A1 * | 10/2022 | ............ | H04W 52/08 |
| CN | 110214465 A * | 9/2019 | ............... | H04B 7/02 |

(Continued)

OTHER PUBLICATIONS

International Search Report and Written Opinion—PCT/US2022/022528—ISA/EPO—Jul. 8, 2022 (2103629WO).

*Primary Examiner* — Andrew C Oh
(74) *Attorney, Agent, or Firm* — Holland & Hart LLP

(57) ABSTRACT

Methods, systems, and devices for wireless communication are described to indicate transmit and receive beam patterns within an SRS resource set configured for beam management. For example, a base station may configure a user equipment (UE) with a sounding reference signal (SRS) resource set for beam management, where the configuration may indicate a transmit beam pattern. The SRS resource set may include one or more groups of SRS resources which may be used to indicate the transmit beam pattern. A transmit beam may be the same for each SRS resource within a respective group, but may be different across different groups. The UE may transmit one or more SRS to the base station, each using a respective transmit beam according to the configuration. The base station may indicate a transmit beam to the UE based on the SRS.

30 Claims, 19 Drawing Sheets

(56) References Cited

U.S. PATENT DOCUMENTS

| | | | |
|---|---|---|---|
| 2020/0137592 A1* | 4/2020 | Guo | H04B 7/0404 |
| 2020/0162133 A1* | 5/2020 | Harrison | H04W 52/248 |
| 2020/0162289 A1* | 5/2020 | Ahn | H04L 5/0053 |
| 2020/0204316 A1* | 6/2020 | Zhang | H04L 5/0048 |
| 2020/0244334 A1* | 7/2020 | Huang | H04W 72/04 |
| 2020/0252182 A1* | 8/2020 | Choi | H04L 5/0048 |
| 2020/0252241 A1* | 8/2020 | Park | H04L 25/0224 |
| 2020/0314860 A1* | 10/2020 | Zhou | H04W 72/23 |
| 2020/0350970 A1* | 11/2020 | Liu | H04L 5/0012 |
| 2021/0044400 A1* | 2/2021 | Jiang | H04L 5/0048 |
| 2021/0194737 A1* | 6/2021 | Gao | H04W 72/53 |
| 2021/0336737 A1* | 10/2021 | Li | H04W 72/21 |
| 2022/0039122 A1* | 2/2022 | Park | H04W 72/1268 |
| 2022/0217654 A1* | 7/2022 | Kang | H04W 52/14 |
| 2022/0353031 A1 | 11/2022 | Khoshnevisan et al. | |
| 2023/0318770 A1* | 10/2023 | Liu | H04L 5/0048 370/329 |
| 2023/0344504 A1* | 10/2023 | Cha | H04B 7/06 |

FOREIGN PATENT DOCUMENTS

| | | | | |
|---|---|---|---|---|
| CN | 116491183 A | * | 7/2023 | H04B 7/0695 |
| CN | 116762418 A | * | 9/2023 | H04B 7/06956 |
| EP | 3481113 A1 | | 5/2019 | |
| EP | 3734884 A1 | * | 11/2020 | H04J 11/005 |
| TW | I710227 B | * | 11/2020 | H04B 7/0408 |
| WO | WO-2014027803 A2 | * | 2/2014 | H04B 7/024 |
| WO | WO-2018085709 A1 | * | 5/2018 | H04B 7/0695 |
| WO | WO-2019195528 A1 | * | 10/2019 | H04B 7/0404 |
| WO | WO-2019216750 A1 | * | 11/2019 | H04B 7/0626 |
| WO | WO-2020068467 A1 | * | 4/2020 | H04L 25/0226 |
| WO | WO-2020121528 A1 | * | 6/2020 | |
| WO | WO-2021133705 A1 | * | 7/2021 | H04L 5/0035 |
| WO | WO-2021207567 A1 | * | 10/2021 | H04B 17/102 |
| WO | WO-2021215977 A1 | * | 10/2021 | G01S 5/0236 |
| WO | WO-2022029899 A1 | * | 2/2022 | H04L 5/0048 |
| WO | WO-2022029900 A1 | * | 2/2022 | H04L 5/0048 |
| WO | WO-2022151307 A1 | * | 7/2022 | H04B 7/06956 |

* cited by examiner

REFERENCE SIGNAL PATTERNS FOR BEAM MANAGEMENT

FIELD OF TECHNOLOGY

The present disclosure relates to wireless communication, including reference signal patterns for beam management.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

In some cases, a UE may transmit reference signals to a base station, for example, as part of one or more communications procedures. The UE may transmit the reference signals to the base station using an uplink beam, which may be based on a downlink beam used to receive signals from the base station.

SUMMARY

The described techniques relate to improved methods, systems, devices, and apparatuses that support reference signal patterns for beam management. Generally, the described techniques provide for indicating a transmit beam pattern within a sounding reference signal (SRS) resource set configured for beam management. For example, a base station may configure a user equipment (UE) with an SRS resource set for beam management, where the configuration of the SRS resource set may indicate a transmit beam pattern. The SRS resource set may include one or more groups of SRS resources, where a transmit beam may be the same for each SRS resource within a respective group, but may be different across different groups. This grouping of SRS resources may be referred to as a transmit beam pattern. The UE may transmit one or more SRS (e.g., on resources of the SRS resource set) to the base station (e.g., via an uplink node or an SUL carrier), where each SRS may be transmitted using the transmit beam according to the configuration. The base station may indicate a transmit beam to the UE based on the SRS, such that the UE may use the transmit beam for uplink communications between the UE and the base station.

A method for wireless communication at a UE is described. The method may include receiving, from a base station, a control signal that indicates an SRS beam management configuration that identifies one or more SRS resource groups within an SRS resource set and a transmit beam pattern that indicates a respective transmit beam for each of the one or more SRS resource groups, transmitting one or more SRS each using a corresponding SRS resource of the SRS resource set and using a corresponding transmit beam based on an SRS resource group to which the corresponding SRS resource belongs, in accordance with the SRS beam management configuration, and receiving, from the base station, an indication of a first transmit beam of the respective transmit beams that the UE is to use for uplink communications.

An apparatus for wireless communication at a UE is described. The apparatus may include a processor, memory coupled with the processor, and instructions stored in the memory. The instructions may be executable by the processor to cause the apparatus to receive, from a base station, a control signal that indicates an SRS beam management configuration that identifies one or more SRS resource groups within an SRS resource set and a transmit beam pattern that indicates a respective transmit beam for each of the one or more SRS resource groups, transmit one or more SRS each using a corresponding SRS resource of the SRS resource set and using a corresponding transmit beam based on an SRS resource group to which the corresponding SRS resource belongs, in accordance with the SRS beam management configuration, and receive, from the base station, an indication of a first transmit beam of the respective transmit beams that the UE is to use for uplink communications.

Another apparatus for wireless communication at a UE is described. The apparatus may include means for receiving, from a base station, a control signal that indicates an SRS beam management configuration that identifies one or more SRS resource groups within an SRS resource set and a transmit beam pattern that indicates a respective transmit beam for each of the one or more SRS resource groups, means for transmitting one or more SRS each using a corresponding SRS resource of the SRS resource set and using a corresponding transmit beam based on an SRS resource group to which the corresponding SRS resource belongs, in accordance with the SRS beam management configuration, and means for receiving, from the base station, an indication of a first transmit beam of the respective transmit beams that the UE is to use for uplink communications.

A non-transitory computer-readable medium storing code for wireless communication at a UE is described. The code may include instructions executable by a processor to receive, from a base station, a control signal that indicates an SRS beam management configuration that identifies one or more SRS resource groups within an SRS resource set and a transmit beam pattern that indicates a respective transmit beam for each of the one or more SRS resource groups, transmit one or more SRS each using a corresponding SRS resource of the SRS resource set and using a corresponding transmit beam based on an SRS resource group to which the corresponding SRS resource belongs, in accordance with the SRS beam management configuration, and receive, from the base station, an indication of a first transmit beam of the respective transmit beams that the UE is to use for uplink communications.

In some examples of the method, apparatuses, and non-transitory computer-readable medium described herein, receiving the control signal that indicates the SRS beam management configuration may include operations, features, means, or instructions for receiving, via the control signal, an additional indication of a number of SRS resources in each of the one or more SRS resource groups, where the transmit beam pattern may be based on the number of SRS resources in each of the one or more SRS resource groups.

In some examples of the method, apparatuses, and non-transitory computer-readable medium described herein, receiving the control signal that indicates the SRS beam management configuration may include operations, features, means, or instructions for receiving, via the control signal, an additional indication of a number of the one or more SRS resource groups in the SRS resource set, where the transmit beam pattern may be based on the number of the one or more SRS resource groups.

Some examples of the method, apparatuses, and non-transitory computer-readable medium described herein may further include operations, features, means, or instructions for identifying the one or more SRS resource groups based on a time domain position of SRS resources of the SRS resource set and a number of SRS resources for each of the one or more SRS resource groups, where the transmit beam pattern may be based on identifying the one or more SRS resource groups.

Some examples of the method, apparatuses, and non-transitory computer-readable medium described herein may further include operations, features, means, or instructions for identifying the one or more SRS resource groups based on an additional identifier (ID) of each SRS resource of the SRS resource set and a number of SRS resources for each of the one or more SRS resource groups, where the transmit beam pattern may be based on identifying the one or more SRS resource groups.

In some examples of the method, apparatuses, and non-transitory computer-readable medium described herein, receiving the control signal that indicates the SRS beam management configuration may include operations, features, means, or instructions for receiving, via the control signal, an additional indication of a time gap between SRS resources within a same SRS resource group of the one or more SRS resource groups, where transmitting the one or more SRS may be based on the time gap.

In some examples of the method, apparatuses, and non-transitory computer-readable medium described herein, transmitting the one or more SRS may include operations, features, means, or instructions for transmitting the one or more SRS each using the corresponding SRS resource within a first SRS resource group of the one or more SRS resource groups with at least the time gap between each of the SRS resources of the first SRS resource group.

Some examples of the method, apparatuses, and non-transitory computer-readable medium described herein may further include operations, features, means, or instructions for transmitting an additional indication of a time gap between SRS resources within different SRS resource groups of the one or more SRS resource groups, where transmitting the one or more SRS may be based on the time gap.

In some examples of the method, apparatuses, and non-transitory computer-readable medium described herein, transmitting the one or more SRS may include operations, features, means, or instructions for transmitting a first SRS using a corresponding first SRS resource of a first SRS resource group of the one or more SRS resource groups and transmitting a second SRS using a corresponding second SRS resource of a second SRS resource group of the one or more SRS resource groups with at least the time gap between the first SRS resource and the second SRS resource.

In some examples of the method, apparatuses, and non-transitory computer-readable medium described herein, transmitting the one or more SRS may include operations, features, means, or instructions for refraining from performing a power control adjustment between transmission of SRS using the corresponding SRS resources of the SRS resource set.

In some examples of the method, apparatuses, and non-transitory computer-readable medium described herein, receiving the control signal that indicates the SRS beam management configuration may include operations, features, means, or instructions for receiving, via the control signal, an additional indication of a power control adjustment state for the SRS resource set, where transmitting the one or more SRS may be based on the power control adjustment state.

In some examples of the method, apparatuses, and non-transitory computer-readable medium described herein, receiving the control signal that indicates the SRS beam management configuration may include operations, features, means, or instructions for receiving the control signal configuring the SRS resource set as a semi-persistent SRS resource set, the control signal including a field indicating whether the control signal includes spatial relationship information for the SRS resource set.

Some examples of the method, apparatuses, and non-transitory computer-readable medium described herein may further include operations, features, means, or instructions for transmitting the one or more SRS during a first period and based on the transmit beam pattern indicated by the SRS beam management configuration and transmitting additional SRS during a second period using respective transmit beams that may be based on the transmit beam pattern indicated by the SRS beam management configuration.

In some examples of the method, apparatuses, and non-transitory computer-readable medium described herein, receiving the indication of the first transmit beam may include operations, features, means, or instructions for receiving signaling indicative of a first SRS resource group of the one or more SRS resource groups, where the first SRS resource group may be associated with the first transmit beam.

In some examples of the method, apparatuses, and non-transitory computer-readable medium described herein, transmitting the one or more SRS may include operations, features, means, or instructions for transmitting the one or more SRS towards an uplink node or via a supplementary uplink (SUL) carrier.

A method for wireless communication at a base station is described. The method may include transmitting, to a UE, a control signal that indicates an SRS beam management configuration that identifies one or more SRS resource groups within an SRS resource set and a transmit beam pattern that indicates a respective transmit beam for each of the one or more SRS resource groups, receiving one or more SRS each transmitted by the UE using a corresponding SRS resource of the SRS resource set and on a corresponding transmit beam based on an SRS resource group to which the corresponding sounding reference resource belongs, in accordance with the SRS beam management configuration, and transmitting, to the UE, an indication of a first transmit beam of the respective transmit beams that the UE is to use for uplink communications.

An apparatus for wireless communication at a base station is described. The apparatus may include a processor, memory coupled with the processor, and instructions stored in the memory. The instructions may be executable by the processor to cause the apparatus to transmit, to a UE, a control signal that indicates an SRS beam management configuration that identifies one or more SRS resource groups within an SRS resource set and a transmit beam pattern that indicates a respective transmit beam for each of the one or more SRS resource groups, receive one or more SRS each transmitted by the UE using a corresponding SRS resource of the SRS resource set and on a corresponding transmit beam based on an SRS resource group to which the corresponding sounding reference resource belongs, in accordance with the SRS beam management configuration, and transmit, to the UE, an indication of a first transmit beam of the respective transmit beams that the UE is to use for uplink communications.

Another apparatus for wireless communication at a base station is described. The apparatus may include means for transmitting, to a UE, a control signal that indicates an SRS beam management configuration that identifies one or more SRS resource groups within an SRS resource set and a transmit beam pattern that indicates a respective transmit beam for each of the one or more SRS resource groups, means for receiving one or more SRS each transmitted by the UE using a corresponding SRS resource of the SRS resource set and on a corresponding transmit beam based on an SRS resource group to which the corresponding sounding reference resource belongs, in accordance with the SRS beam management configuration, and means for transmitting, to the UE, an indication of a first transmit beam of the respective transmit beams that the UE is to use for uplink communications.

A non-transitory computer-readable medium storing code for wireless communication at a base station is described. The code may include instructions executable by a processor to transmit, to a UE, a control signal that indicates an SRS beam management configuration that identifies one or more SRS resource groups within an SRS resource set and a transmit beam pattern that indicates a respective transmit beam for each of the one or more SRS resource groups, receive one or more SRS each transmitted by the UE using a corresponding SRS resource of the SRS resource set and on a corresponding transmit beam based on an SRS resource group to which the corresponding sounding reference resource belongs, in accordance with the SRS beam management configuration, and transmit, to the UE, an indication of a first transmit beam of the respective transmit beams that the UE is to use for uplink communications.

Some examples of the method, apparatuses, and non-transitory computer-readable medium described herein may further include operations, features, means, or instructions for configuring a respective receive beam for each SRS resource within an SRS resource group of the one or more SRS resource groups and selecting a first receive beam of the respective receive beams to use for uplink communications with the UE based on receipt of the one or more SRS using the first receive beam.

Some examples of the method, apparatuses, and non-transitory computer-readable medium described herein may further include operations, features, means, or instructions for selecting the first transmit beam based on a signal quality associated with the one or more SRS.

In some examples of the method, apparatuses, and non-transitory computer-readable medium described herein, transmitting the control signal that indicates the SRS beam management configuration may include operations, features, means, or instructions for transmitting, via the control signal, an additional indication of a number of SRS resources in each of the one or more SRS resource groups, where the transmit beam pattern may be based on the number of SRS resources in each of the one or more SRS resource groups.

In some examples of the method, apparatuses, and non-transitory computer-readable medium described herein, transmitting the control signal that indicates the SRS beam management configuration may include operations, features, means, or instructions for transmitting, via the control signal, an additional indication of a number of the one or more SRS resource groups for the SRS resource set, where the transmit beam pattern may be based on the number of SRS resource groups.

Some examples of the method, apparatuses, and non-transitory computer-readable medium described herein may further include operations, features, means, or instructions for identifying the one or more SRS resource groups based on a time domain position of SRS resources of the SRS resource set and a number of SRS resources for each of the one or more SRS resource groups, where transmitting the control signal indicating the transmit beam pattern may be based on identifying the one or more SRS resource groups.

Some examples of the method, apparatuses, and non-transitory computer-readable medium described herein may further include operations, features, means, or instructions for identifying the one or more SRS resource groups based on an additional ID of each SRS resource of the SRS resource set and a number of SRS resources for each of the one or more SRS resource groups, where transmitting the control signal indicating the transmit beam pattern may be based on identifying the one or more SRS resource groups.

In some examples of the method, apparatuses, and non-transitory computer-readable medium described herein, transmitting the control signal that indicates the SRS beam management configuration may include operations, features, means, or instructions for transmitting, via the control signal, an additional indication of a time gap between SRS resources within a same SRS resource group of the one or more SRS resource groups, where receiving the one or more SRS may be based on the time gap.

Some examples of the method, apparatuses, and non-transitory computer-readable medium described herein may further include operations, features, means, or instructions for receiving an additional indication of a time gap between SRS resources within different SRS resource groups of the one or more SRS resource groups, where receiving the one or more SRS may be based on the time gap.

In some examples of the method, apparatuses, and non-transitory computer-readable medium described herein, transmitting the control signal that indicates the SRS beam management configuration may include operations, features, means, or instructions for transmitting, via the control signal, an additional indication of a power control adjustment state for the SRS resource set, where receiving the one or more SRS may be based on the power control adjustment state.

In some examples of the method, apparatuses, and non-transitory computer-readable medium described herein, transmitting the control signal that indicates the SRS beam management configuration may include operations, features, means, or instructions for transmitting the control signal configuring the SRS resource set as a semi-persistent SRS resource set, the control signal including a field indicating whether the control signal includes spatial relationship information for the SRS resource set.

In some examples of the method, apparatuses, and non-transitory computer-readable medium described herein, transmitting the indication of the first transmit beam may include operations, features, means, or instructions for transmitting signaling indicative of a first SRS resource group of the one or more SRS resource groups, where the first SRS resource group may be associated with the first transmit beam.

In some examples of the method, apparatuses, and non-transitory computer-readable medium described herein, receiving the one or more SRS may include operations, features, means, or instructions for receiving the one or more SRS via an uplink node or via an SUL carrier.

DETAILED DESCRIPTION

Figure 1:
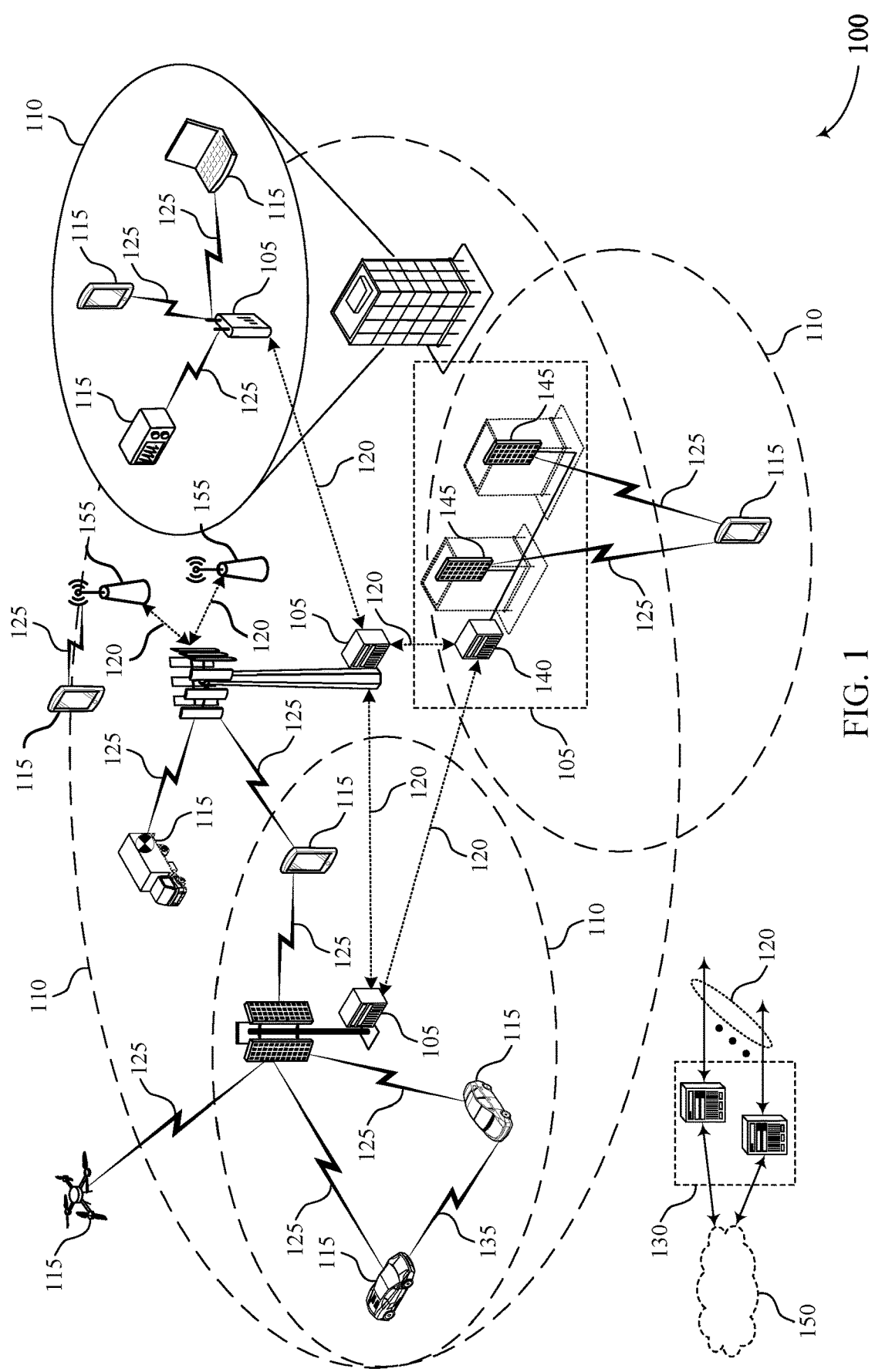
FIG. 1 illustrates an example of a wireless communications system that supports reference signal patterns for beam management in accordance with aspects of the present disclosure.

A user equipment (UE) and a base station may communicate using one or more beams (e.g., communication beams, shaped using beamforming techniques). For example, for uplink communications, the UE may use a transmit beam (e.g., an uplink transmit beam) for transmitting information or data to the base station, and the base station may use a receive beam (e.g., uplink receive beam) to receive the transmitted information or data. In the uplink, the UE may transmit one or more sounding reference signals (SRS) to the base station, where an applicability or usage of the SRS (e.g., of a corresponding SRS resource set) may be configured by the base station to be for beam management. An uplink beam for SRS transmissions may be configured (e.g., by the base station) by pointing to or indicating a downlink reference signal corresponding to the uplink beam or another SRS corresponding to the uplink beam.

In some examples, the UE and the base station may communicate in the uplink via one or more uplink nodes. In such cases, the uplink nodes may be connected to the base station and may receive uplink signals and/or channels from the UE and forward associated uplink data or uplink information to the base station. Downlink signals and/or channels may be transmitted to the UE from the base station, which may represent a different communication node (e.g., at a different location) than any uplink nodes used for uplink communications. Additionally or alternatively, the UE and the base station may communicate in the uplink via a supplementary uplink (SUL) carrier, where the UE may be configured with two uplink carriers (e.g., one of which may be configured as SUL) for one downlink carrier of a same serving cell.

In cases where the UE communicates with the base station in the uplink via an uplink node, uplink transmit and receive beams may be associated with the uplink node (e.g., and not with downlink beams from the base station). Similarly, in cases where the UE communicates with the base station using an SUL carrier, uplink transmit and receive beams for the SUL carrier may not be associated with any corresponding beams for the associated downlink carrier. As such, when the UE communicates in the uplink via an uplink node, or via an SUL carrier, a beam correspondence may not exist between downlink and uplink beams (e.g., for use in uplink beam management). A downlink reference signal may therefore not be used to indicate an uplink beam because the uplink and downlink beams may not correspond to each other in these communication scenarios. In such cases, uplink beams may be indicated using SRS. However, in some cases, an SRS resource set configuration for uplink beam management that is based on SRS (e.g., previously transmitted SRS) may fail to distinguish between receive and transmit beam adjustment within resources of the SRS resource set.

The present disclosure provides techniques for indicating transmit and receive beam patterns within an SRS resource set configured for beam management. For example, the base station may configure the UE with an SRS resource set for beam management, where the configuration of the SRS resource set may indicate a transmit beam pattern. The SRS resource set may include one or more groups of SRS resources, where a transmit beam (e.g., a spatial relation filter) may be the same for each SRS resource within a respective group, but may be different across different groups. This grouping of SRS resources may be referred to as a transmit beam pattern, and may be indicated in the configuration of the SRS resource set by indicating an explicit group pattern, a size of a group of SRS resources, or a number of groups of SRS resources in the set, among other examples. The pattern may be defined for one time period or across multiple time periods, for example, for semi-persistent or periodic SRS.

The UE may transmit one or more SRS (e.g., on resources of the SRS resource set) to the base station (e.g., via an uplink node or an SUL carrier), where each SRS may be transmitted using the transmit beam according to the configuration. For example, the UE may transmit multiple SRS signals, where those associated with a same group of resources may share a same transmit beam and those associated with different groups of resources may have different transmit beams. The base station may perform UE transmit beam sweeping using SRS received on different groups of SRS resources and may perform base station receive beam sweeping using SRS received within a same group of SRS resources and may determine a transmit beam and/or a receive beam for uplink communications based on the respective beam sweeping. The base station may indicate the transmit beam to the UE, such that the UE and the base station may use the determined transmit and/or receive beams for uplink communications between the UE and the base station (e.g., via an uplink node or an SUL carrier).

Aspects of the disclosure are initially described in the context of wireless communications systems. Aspects of the disclosure are further illustrated by and described with reference to resource configurations, a process flow, apparatus diagrams, system diagrams, and flowcharts that relate to reference signal patterns for beam management.

FIG. 1 illustrates an example of a wireless communications system 100 that supports reference signal patterns for beam management in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

The time intervals for the base stations 105 or the UEs 115 may be expressed in multiples of a basic time unit which may, for example, refer to a sampling period of $T_s = 1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

In some cases, wireless communications system may include one or more uplink nodes 155. Uplink nodes 155 may represent uplink receive points that are configured for reception of uplink transmissions from UEs 115 (e.g., via a communication link 125), but may not be configured for transmission of downlink transmissions to UEs 115. The uplink nodes 155 may communicate or forward received uplink transmissions to an associated base station 105, such as via a backhaul link 120. In some cases, a UE 115 and a base station 105 may communicate in the uplink via an SUL carrier.

In cases where the UE 115 communicates with the base station 105 in the uplink via an uplink node 155 or via an SUL carrier, uplink transmit and receive beams for the SUL carrier or the uplink node 155 may not be associated with any corresponding downlink beams. The base station 105 may therefore indicate transmit and receive beam patterns within an SRS resource set configured for beam management. For example, the base station 105 may configure the UE 115 with an SRS resource set for beam management, where the configuration of the SRS resource set may indicate a transmit beam pattern. The SRS resource set may include one or more groups of SRS resources, where a transmit beam (e.g., a spatial relation filter) may be the same for each SRS resource within a respective group, but may be different across different groups. This grouping of SRS resources may be referred to as a transmit beam pattern. The UE 115 may transmit one or more SRS (e.g., on resources of the SRS resource set) to the base station 105 (e.g., via an uplink node 155 or an SUL carrier), according to the transmit beam pattern. The base station 105 may indicate a transmit beam to the UE 115 based on the transmitted SRS.

Figure 2:
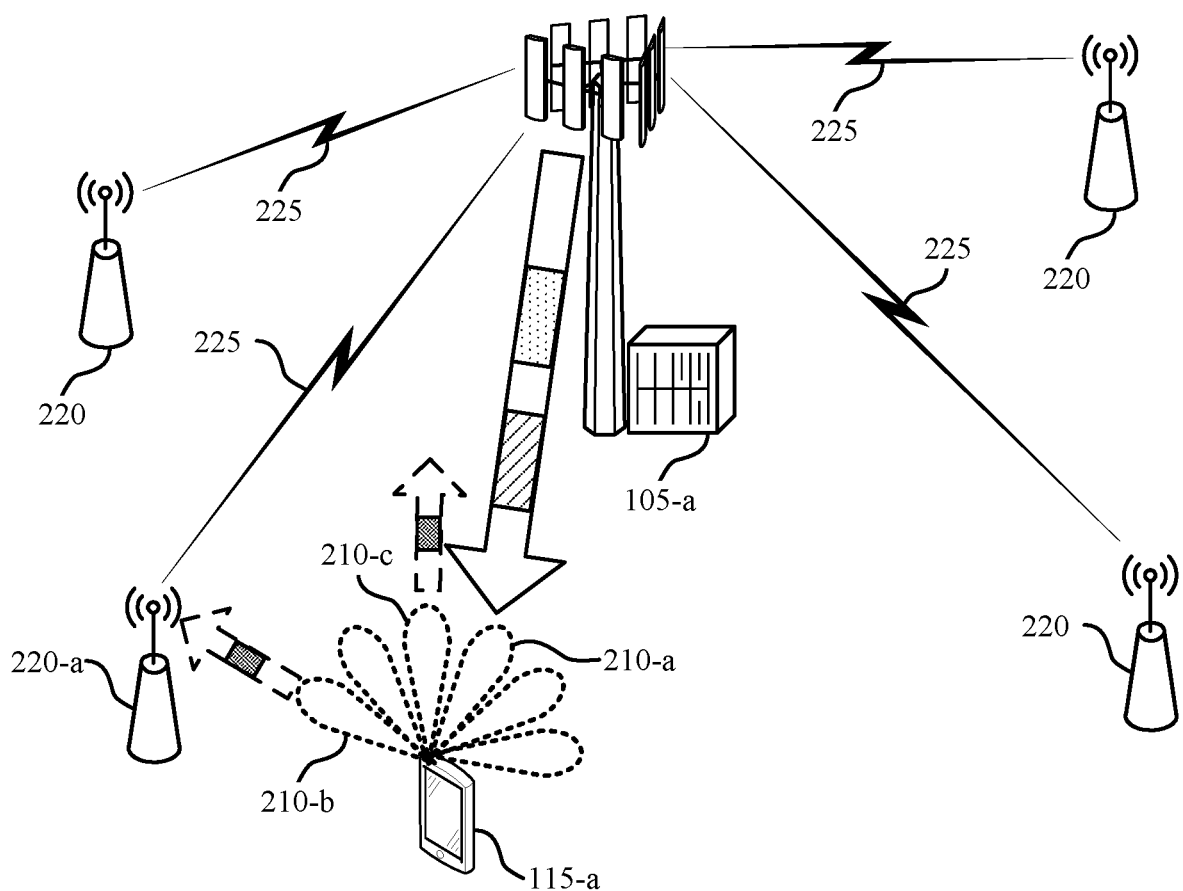
FIG. 2 illustrates an example of a wireless communications system that supports reference signal patterns for beam management in accordance with aspects of the present disclosure.

FIG. 2 illustrates an example of a wireless communications system 200 that supports reference signal patterns for beam management in accordance with aspects of the present disclosure. In some examples, wireless communications system 200 may implement some aspects of wireless communications system 100. For example, wireless communications system 200 may include a UE 115-*a* and a base station 105-*a*, which may be examples of the corresponding devices as described with reference to FIG. 1. In some cases, wireless communications system 200 may also include one or more uplink nodes 220, which may be examples of an uplink node 155 described with reference to FIG. 1.

As described with reference to FIG. 1, UE 115-*a* and base station 105-*a* may communicate using one or more beams 210 (e.g., communication beams 210, shaped using beamforming techniques). For example, for uplink communications, UE 115-*a* may use a transmit beam 210 (e.g., uplink transmit beam 210) for transmitting information or data to base station 105-*a*, and base station 105-*a* may use a receive beam 210 (e.g., uplink receive beam 210) to receive the transmitted information or data. In the uplink, UE 115-*a* may transmit one or more SRS 215 to base station 105-*a*, where an applicability or usage of the SRS 215 (e.g., of a corresponding SRS resource set) may be configured by base station 105-*a* (e.g., using a higher layer parameter, such as a usage parameter within an SRS-ResourceSet configuration) and may, for example, be indicated by base station 105-*a* to UE 115-*a*.

For example, base station 105-*a* may configure a usage of an SRS resource set to be for beam management, codebook, non-codebook, or antenna switching, among other examples. In some cases, each SRS resource set may be configured (e.g., by base station 105-*a*) with up to 16 SRS resources, and each SRS resource set may include aperiodic, semi-persistent, or periodic SRS resources. If usage of an SRS resource set is set to be for beam management (e.g., set to beamManagement), only one SRS resource in each SRS resource set may be used for SRS transmission at a time (e.g., at a given time instant), while SRS resources in different SRS resource sets with a same time domain behavior (e.g., and in a same BWP) may be used for SRS transmission simultaneously.

An uplink beam 210 for SRS transmission may be configured (e.g., by base station 105-*a*), for example, by pointing to or indicating a reference signal for the uplink beam 210 (e.g., may include spatial relationship information for each SRS 215, such as by using SRS-SpatialRelationInfo). For example, the configuration of the SRS resource set may indicate a synchronization signal block (SSB) index, a channel state information reference signal (CSI-RS) resource identifier (ID), or a combination thereof, for SRS resources of the SRS resource set. In such cases, UE 115-*a* may transmit an SRS 215, in an indicated SRS resource, using a same spatial domain transmission filter (e.g., for beamforming) used for reception of the corresponding, indicated CSI-RS or SSB (e.g., synchronization signal and/or physical broadcast channel (PBCH) block). For example, if the SRS resource set configuration indicates an SSB index or a CSI-RS ID corresponding to a downlink, receive beam 210-*a*, UE 115-*a* may use a spatial domain filter that corresponds to receive beam 210-*a* for transmitting the associated SRS 215.

Additionally or alternatively, the configuration of the SRS resource set may indicate an associated SRS resource ID for each SRS resource of the SRS resource set (e.g., to indicate a corresponding uplink beam 210 for each resource). In such cases, UE 115-*a* may transmit an SRS 215, in an indicated SRS resource, using a same spatial domain transmission filter used for transmission of the corresponding, indicated SRS. The configuration of the SRS resource set may, in some cases, include a transmission configuration indicator (TCI) state for the SRS resources of the SRS resource set, which may have a similar functionality as the spatial relationship information (e.g., may indicate corresponding uplink beams 210 for the SRS resources).

In some cases, UE 115-*a* and base station 105-*a* may communicate in the uplink via one or more uplink nodes 220 (e.g., in an uplink dense deployment scenario). In such cases, UE 115-*a* may transmit uplink signals and/or channels to an uplink receive point, which may be represented by an uplink node 220 (e.g., uplink node 220-*a*). The uplink nodes 220 may be connected to base station 105-*a* (e.g., a macro node) via backhaul links 225 (e.g., wired or wireless links, which may be examples of a backhaul link 120 described with reference to FIG. 1), such that one or more uplink nodes 220 may receive the uplink signals and/or channels from UE 115-*a* and forward associated uplink data or uplink information to base station 105-*a* (e.g., transmit an indication of the uplink data or information, such as via the backhaul link 225). Downlink signals and/or channels may be transmitted to UE 115-*a* from base station 105-*a* (e.g., a macro node, serving cell, serving base station 105), which may represent a different communication node (e.g., at a different location) than any uplink nodes 220 used for uplink communications.

An uplink dense deployment scenario as described herein may improve uplink coverage and/or capacity. For example, using one or more uplink nodes 220 for communications between UE 115-*a* and base station 105-*a* may reduce uplink pathloss (e.g., among other examples). The reduction in pathloss may increase uplink communication speed and throughput, which may in turn reduce a bottlenecking effect for the uplink communications (e.g., as compared to downlink communications). Additionally or alternatively, uplink dense deployment may reduce deployment cost and/or complexity for network entities (e.g., for uplink nodes 220), while increasing coverage, because the uplink nodes 220 may not be configured to transmit downlink signals or perform configurations. For example, each uplink node 220 may be configured to receive uplink signals (e.g., from UE 115-*a*) and send the uplink signals to base station 105-*a* (e.g., with or without some processing).

In some cases, UE 115-*a* and base station 105-*a* may communicate in the uplink via an SUL carrier. In such cases, UE 115-*a* may be configured with two uplink carriers for one downlink carrier of a same serving cell, where uplink transmissions on the two uplink carriers may not be simultaneous (e.g., may never be simultaneous). One of the uplink carriers may be configured as SUL (e.g., such that the other uplink carrier may be a non-SUL or normal uplink (NUL) carrier), and UE 115-*a* may choose which uplink carrier to use for uplink transmissions. In one example, UE 115-*a* may be configured with a TDD band (e.g., TDD uplink carrier) and SUL carrier, such that UE 115-*a* may transmit uplink information on either the TDD band (e.g., non-SUL or NUL carrier) or on the SUL carrier.

In cases where UE 115-*a* communicates with base station 105-*a* in the uplink via an uplink node 220 (e.g., uplink node 220-*a*), uplink transmit and receive beams 210 may be associated with the uplink node 220 (e.g., and not with base station 105-*a*). Similarly, in cases where UE 115-*a* communicates with base station 105-*a* using an SUL carrier, uplink transmit and receive beams 210 for the SUL carrier may not be associated with any corresponding beams 210 for the associated downlink carrier. As such, when UE 115-*a* communicates in the uplink via an uplink node 220, or via an SUL carrier, a beam correspondence may not exist between downlink and uplink beams 210 (e.g., for use in uplink beam management). A downlink reference signal (e.g., CSI-RS and/or SSB) may therefore not be used to indicate an uplink beam 210 (e.g., via spatial relation information), for example, because the uplink and downlink beams 210 may not correspond to each other in these communication scenarios.

In such cases (e.g., where a correspondence does not exist between uplink and downlink beams 210), uplink beam management (e.g., performing transmit and/or receive beam adjustment) may be performed based on SRS. For example, the SRS resource set configuration may indicate uplink beams 210 for the SRS resources of the set by indicating SRS associated with the uplink beams 210. Performing receive beam adjustment may include fixing a transmit beam 210 at UE 115-*a* and adjusting receive beams 210 for different SRS at base station 105-*a* (e.g., at an uplink node 220 of base station 105-*a*). Similarly, performing transmit beam adjustment may include adjusting transmit beams 210 for different SRS at UE 115-*a*, such that base station 105-*a* may select a best transmit beam 210 (e.g., a beam 210 resulting in a highest signal quality). However, in some cases, an SRS resource set configuration for uplink beam management that is based on SRS (e.g., previously transmitted SRS) may fail to distinguish between receive beam adjustment at base station 105-*a* and transmit beam adjustment at UE 115-*a* (e.g., may fail to distinguish between receive and transmit beam adjustment within resources of the SRS resource set).

In some cases, a closed loop power control adjustment (e.g., a transmit power control (TPC) command) may be applied at a beginning of each SRS resource within an SRS resource set (e.g., if a closed loop power control adjustment is the same for SRS and for a physical uplink shared channel (PUSCH)), which may result in different transmit powers for different SRS 215. As such, UE 115-*a* may not maintain a fixed transmit power for one instance of transmit and/or receive beam adjustment (e.g., transmit and/or receive beam sweeping) across SRS resources within an SRS resource set, which may result in skewed results of the transmit and/or receive beam adjustment. For example, base station 105-*a* may be unable to select a best transmit beam or receive beam if transmit powers differ across SRS resources within an SRS resource set, because a signaling quality of the beams may be affected by the different power levels.

Additionally or alternatively, in some cases, an SRS configuration for uplink beam management based on SRS may fail to indicate a gap (e.g., a minimum gap) for beam switching at either UE 115-*a* (e.g., to switch transmit beams 210) or at base station 105-*a* (e.g., to switch receive beams 210). Such a gap may, for example, be relevant for higher frequency bands (e.g., 52.6 GHz to 71 GHz) because a subcarrier spacing (SCS) for the higher frequency bands may be increased (e.g., up to 960 kHz), which may result in a shorter cyclic prefix duration. In such cases, beam switching may not be absorbed (e.g., covered) by the cyclic prefix. As such, a gap may be configured between SRS transmissions for beam switching, such that the beam switching may take place within the gap.

The present disclosure provides techniques for indicating a transmit beam pattern within an SRS resource set configured for beam management (e.g., usage=beamManagement), as well as techniques for indicating or determining transmission power and transmission gaps for the SRS resource set. For example, base station 105-*a* may configure UE 115-*a* with an SRS resource set for beam management (e.g., via control signaling 205), where the configuration of the SRS resource set may indicate a transmit beam pattern. The SRS resource set may include one or more groups of SRS resources, where a transmit beam 210 (e.g., a spatial relation filter) may be the same for each SRS resource within a respective group, but may be different across different groups. This grouping of SRS resources may be referred to as a transmit beam pattern, and may be indicated in the configuration of the SRS resource set by indicating an explicit group pattern, a size of a group of SRS resources, or a number of groups of SRS resources in the set, among other examples. The pattern may be defined for one time period or across multiple time periods, for example, for semi-persistent or periodic SRS.

In some cases, UE 115-*a* may indicate a first time gap for adjusting transmit beams 210 at UE 115-*a* and/or receive an indication (e.g., via control signaling 205) of a second time gap associated with receive beam adjustment at base station 105-*a*. In such cases, UE 115-*a* may apply the first time gap between transmissions on different groups of SRS resources and/or apply the second time gap between transmission on SRS resources in a same group. UE 115-*a* may additionally or alternatively refrain from performing power adjustments when transmitting SRS 215 using a same SRS resource set, for example, based on ignoring a TPC command or based on being configured with a separate power control adjustment state for the SRS resource set.

According to the examples described herein, UE 115-*a* may transmit one or more SRS 215 (e.g., on the SRS resource set) for beam management to base station 105-*a* (e.g., via an uplink node 220 or an SUL carrier), where each SRS 215 may be transmitted using the transmit beam according to the configuration (e.g., one or more SRS 215 may use a transmit beam 210-*b* or 210-*c*). For example, UE 115-*a* may transmit multiple SRS signals 215, where those associated with a same group of resources may share a same transmit beam 210 and those associated with different groups of resources may have different transmit beams 210. Base station 105-a may perform UE transmit beam sweeping using SRS 215 received on different groups of SRS resources and may perform base station receive beam sweeping using SRS 215 received within a same group of SRS resources.

Base station 105-a may determine a transmit beam 210 and/or a receive beam 210 (e.g., used by base station 105-a) for uplink communications based on the SRS 215 and may indicate the transmit beam 210 to UE 115-a (e.g., via an indication 230). For example, base station 105-a may indicate that the transmit beam 210 is to be used for other SRS transmissions (e.g., for SRS resource sets with usage set to beam management or to another usage), for a data channel (e.g., a PUSCH), for a control channel (e.g., a physical uplink control channel (PUCCH)), or any combination thereof. Base station 105-a may indicate the transmit beam 210 by indicating an ID of an SRS resource associated with the transmit beam, or by indicating an ID of an SRS resource group associated with the transmit beam 210 (e.g., which may reduce signaling overhead because all SRS resources in a same group may be associated with a same transmit beam 210).

UE 115-a and base station 105-a may use the determined transmit and/or receive beams 210 for uplink communications between UE 115-a and base station 105-a (e.g., via an uplink node 220 or an SUL carrier). For example, UE 115-a may use a same transmit beam 210 (e.g., spatial domain transmission filter) used for transmission of the SRS 215 on SRS resources indicated by the SRS resource ID or group resource ID. Using the determined transmit and/or receive beams 210 may result in an increase in communication quality between base station 105-a and UE 115-a, for example, based on a decrease in uplink pathloss, an increase in uplink throughput, an increase in uplink coverage, or any combination thereof.

Figure 3:
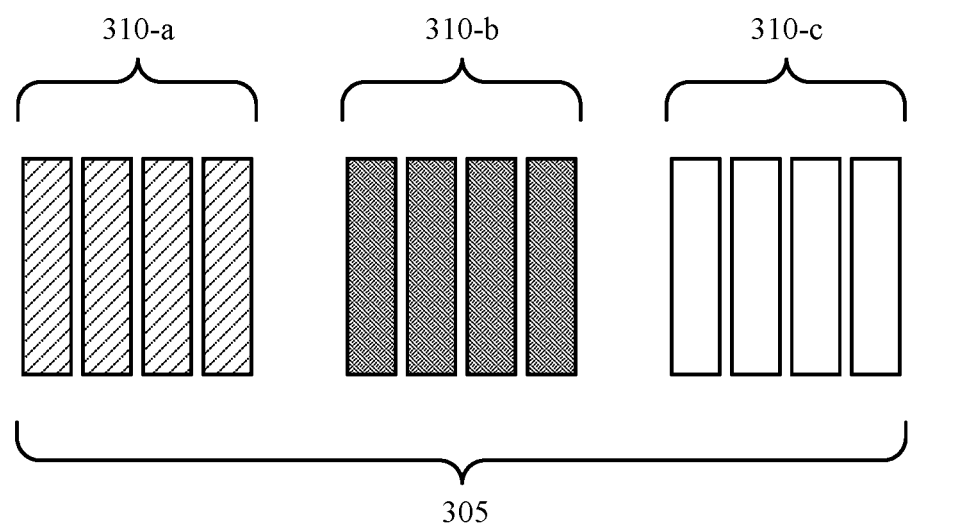
FIG. 3 illustrates an example of a resource configuration that supports reference signal patterns for beam management in accordance with aspects of the present disclosure.

FIG. 3 illustrates an example of a resource configuration 300 that supports reference signal patterns for beam management in accordance with aspects of the present disclosure. In some examples, resource configuration 300 may implement or be implemented by some aspects of wireless communications system 100 or 200. For example, resource configuration 300 may be an example of a configuration communicated from a base station 105 to a UE 115, which may be examples of the corresponding devices as described with reference to FIGS. 1 and 2. Resource configuration 300 may indicate an SRS resource set 305 and one or more groups 310 of SRS resources, for example, as described with reference to FIG. 2.

The base station 105 may configure the UE 115 with the SRS resource set 305, with usage of the SRS resource set 305 set to beam management. The resource configuration 300 may indicate a transmit beam pattern using the one or more groups 310 of SRS resources. As described with reference to FIG. 2, a transmit beam (e.g., a spatial relation filter) may be the same for each SRS resource within a respective group 310, but may be different across different groups 310. In a first example of the resource configuration 300, the SRS resource set 305 may include SRS resource groups 310-a, 310-b, and 310-c. SRS resources within group 310-a (e.g., SRS resources 1-4) may be associated with a first transmit beam, SRS resources within group 310-b (e.g., SRS resources 5-8) may be associated with a second transmit beam, and SRS resources within group 310-c (e.g., SRS resources 9-12) may be associated with a third transmit beam.

This grouping of SRS resources may be referred to as a transmit beam pattern, and may be indicated in the resource configuration 300 as described with reference to FIG. 2. In some cases, the indication of the transmit beam pattern, or the groups 310 of SRS resources, may be based on whether spatial relationship information (e.g., SRS-SpatialRelationInfo) or an uplink TCI state is configured for the SRS resource set 305. For example, if one or both of the spatial relationship information or the uplink TCI state is configured, the beams for the SRS resource set 305 may be indicated by the spatial relationship information or the uplink TCI state. As such, the pattern indicated by the groups 310 of SRS resources may not be applicable to the SRS resource set 305 (e.g., and the UE 115 and/or the base station 105 may ignore or refrain from configuring such a pattern).

In a second example of the resource configuration 300 (e.g., additionally or alternatively), the base station 105 may indicate to the UE 115 that the SRS resource set 305 includes one group 310 of SRS resources for the entire SRS resource set 305. In this example, the grouping may indicate for the UE 115 to transmit all the SRS over the SRS resource set 305 with a same transmit beam. This configuration may be applicable for receive beam adjustment at the base station 105, such that the base station 105 may change different receive beams while the UE 115 maintains a same transmit beam.

In a third example of the resource configuration 300 (e.g., additionally or alternatively), the base station 105 may indicate to the UE 115 that each resource of the SRS resource set 305 belongs to a different group 310 (e.g., each group 310 includes one resource). In this example, the grouping may indicate for the UE 115 to transmit each SRS over the SRS resource set 305 with a different, respective transmit beam. This configuration may be applicable for transmit beam adjustment, such that the base station 105 may select a transmit beam from the set of transmit beams used for the SRS.

Other examples of resource grouping may apply to resource configuration 300 without departing from the scope of the present disclosure. For example, any number of groups 310 may be included in the SRS resource set 305, where each group 310 may include any number of resources. Such groups and configurations may be based on the number of SRS resources within the SRS resource set 305, one or more characteristics of a beam management procedure (e.g., performing transmit beam adjustment, receive beam adjustment, or both), or any combination thereof.

According to the examples described herein, the UE 115 may transmit one or more SRS signals (e.g., using the SRS resource set 305) to the base station 105. Each SRS signal may be transmitted using a transmit beam according to the resource configuration 300. For example, an SRS signal may be transmitted using a transmit beam corresponding to the group 310 of SRS resources used for transmission of the SRS signal (e.g., one SRS resource of the group 310 may be used for transmission the SRS signal). The base station 105 may perform UE transmit beam sweeping using SRS received on different groups 310 of SRS resources and may perform base station receive beam sweeping using SRS received within a same group 310 of SRS resources. In some cases, if an SRS resource includes more than one symbol (e.g., two or four symbols), the base station 105 may use the SRS resource for receive beam adjustment on different symbols. For example, the base station 105 may use a different receive beam on each symbol of the SRS resource, or may use a different receive beam for different subsets of symbols of the SRS resource.

The base station 105 may determine a transmit beam and/or a receive beam for uplink communications based on the received SRS and may indicate the transmit beam to the UE 115. The UE 115 and the base station 105 may use the determined transmit and/or receive beams for uplink communications between the UE 115 and the base station 105. For example, the UE 115 may use a same transmit beam (e.g., spatial domain transmission filter) used for transmission of the SRS on SRS resources indicated by the base station (e.g., using an SRS resource ID or group resource ID). Using the determined transmit and/or receive beams may result in an increase in communication quality between the base station 105 and the UE 115, for example, based on a decrease in uplink pathloss, an increase in uplink throughput, an increase in uplink coverage, or any combination thereof.

Figure 4A:
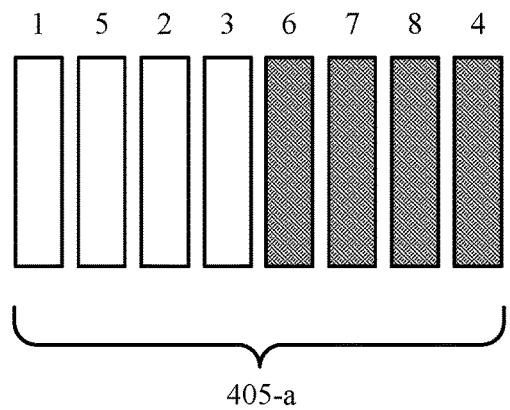
FIGS. 4A and 4B illustrates examples of resource configurations that support reference signal patterns for beam management in accordance with aspects of the present disclosure.
Figure 4B:
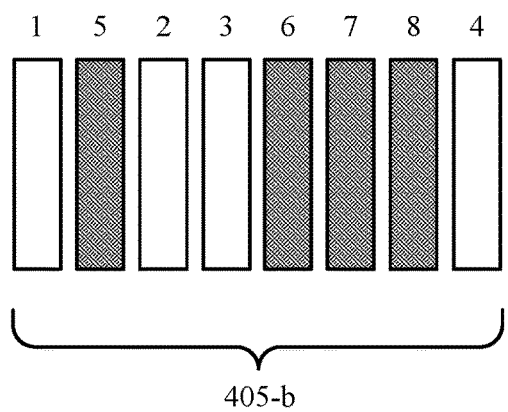

FIGS. 4A and 4B illustrate examples of resource configurations 401 and 402 that support reference signal patterns for beam management in accordance with aspects of the present disclosure. In some examples, resource configurations 401 and 402 may implement or be implemented by some aspects of wireless communications system 100 or 200. For example, resource configurations 401 and 402 may be an example of a configuration communicated from a base station 105 to a UE 115, which may be examples of the corresponding devices as described with reference to FIGS. 1 and 2. Resource configurations 401 and 402 may indicate an SRS resource set 405 and one or more groups 410 of SRS resources, for example, as described with reference to FIGS. 2 and 3.

In some examples, resource configurations 401 or 402, or any other resource configuration, may be indicated by the base station 105 to the UE 115. For example, a pattern of groups 410 (e.g., a transmit and/or receive beam switching pattern) for a respective SRS resource set 405 may be configured via RRC signaling, indicated by a MAC control element (MAC-CE) message, dynamically indicated by downlink control information (DCI) (e.g., that triggers an aperiodic SRS resource set 405), or any combination thereof.

In some examples, a pattern of SRS resource groups 410 may be determined (e.g., by the base station 105, the UE 115, or both) based on a number (e.g., m1) of groups 410 within the SRS resource set 405, a number (e.g., m2) of SRS resources within a group 410, or both. The number of groups 410 (e.g., m1) may represent a number of different transmit beams for the SRS resource set 405 (e.g., a maximum number of transmit beams) and the number of resources within a group 410 (e.g., m2) may represent a number of resources with a same transmit beam (e.g., a maximum number of resources with the same transmit beam).

The base station 105 may determine or be preconfigured with m1, m2, or both. In some cases, the base station 105 may indicate m1, m2, or both, to the UE 115, or the UE 115 may be configured with one or more of these numbers. If m1 is configured, m2 may be determined as a total number of SRS resources in the SRS resource set 405 divided by m1 (e.g., N/m1). If m2 is configured, m1 may be determined as a total number of SRS resources in the SRS resource set 405 divided by m2 (e.g., N/m2).

In a first example illustrated by FIG. 4A, the pattern of groups 410 may be based on a time domain position of the SRS resources of an SRS resource set 405-a. For example, a first m2 resources (e.g., in time) of the SRS resource set 405-a may belong to a first group 410-a. These resources may be used to transmit SRS with a same, first transmit beam. A next m2 resources of the SRS resource set 405-a may belong to a second group 410-b, and these resources may be used to transmit SRS with a second transmit beam. The SRS resource set 405-a may include any number of resource groups 410 in this manner, up to a total number of resources in the SRS resource set 405-a.

In one example, SRS resource IDs 1, 5, 2, and 3 may come first in a time domain, and thus these SRS resources may belong to group 410-a. Similarly, SRS resource IDs 6, 7, 8 and 4 may come next in the time domain and may belong to group 410-b. This type of configuration may result in first performing receive beam sweeping (e.g., by the base station 105, using resources in a same group 410), then performing transmit beam sweeping by the UE 115 (e.g., using resources across different groups 410).

In a second example illustrated by FIG. 4B, the pattern of groups 410 may be based on SRS resource IDs for an SRS resource set 405-b. For example, a first m2 SRS resource IDs (e.g., m2 smallest resource IDs) of the SRS resource set 405-b may belong to a first group 410-c. These resources may be used to transmit SRS with a same, first transmit beam. A next m2 SRS resource IDs (e.g., having the next smallest IDs) of the SRS resource set 405-b may belong to a second group 410-d, and these resources may be used to transmit SRS with a second transmit beam. The SRS resource set 405-b may include any number of resource groups 410 in this manner, up to a total number of resources in the SRS resource set 405-b.

In one example, SRS resource IDs 1, 2, 3, and 4 may have the smallest SRS resource IDs, and thus these SRS resources may belong to group 410-c. Similarly, SRS resource IDs 5, 6, 7, and 8 may come next and may belong to group 410-d. This type of configuration may result in performing receive beam sweeping and transmit beam sweeping without a fixed order. For example, the beam sweeping may be based on the SRS resource IDs and the configuration of the SRS resources, which may be different for different SRS resource sets 405.

According to the examples described herein, the UE 115 may transmit one or more SRS signals (e.g., using the SRS resource set 405) to the base station 105. Each SRS signal may be transmitted using a transmit beam according to the resource configuration. For example, an SRS signal may be transmitted using a transmit beam corresponding to the group 410 of SRS resources used for transmission of the SRS signal (e.g., corresponding to the SRS resource used for transmission). The base station 105 may determine a transmit beam and/or a receive beam for uplink communications based on the received SRS and may indicate the transmit beam to the UE 115. The UE 115 and the base station 105 may use the determined transmit and/or receive beams for uplink communications between the UE 115 and the base station 105, which may result in an increase in communication quality between the base station 105 and the UE 115.

Figure 5:
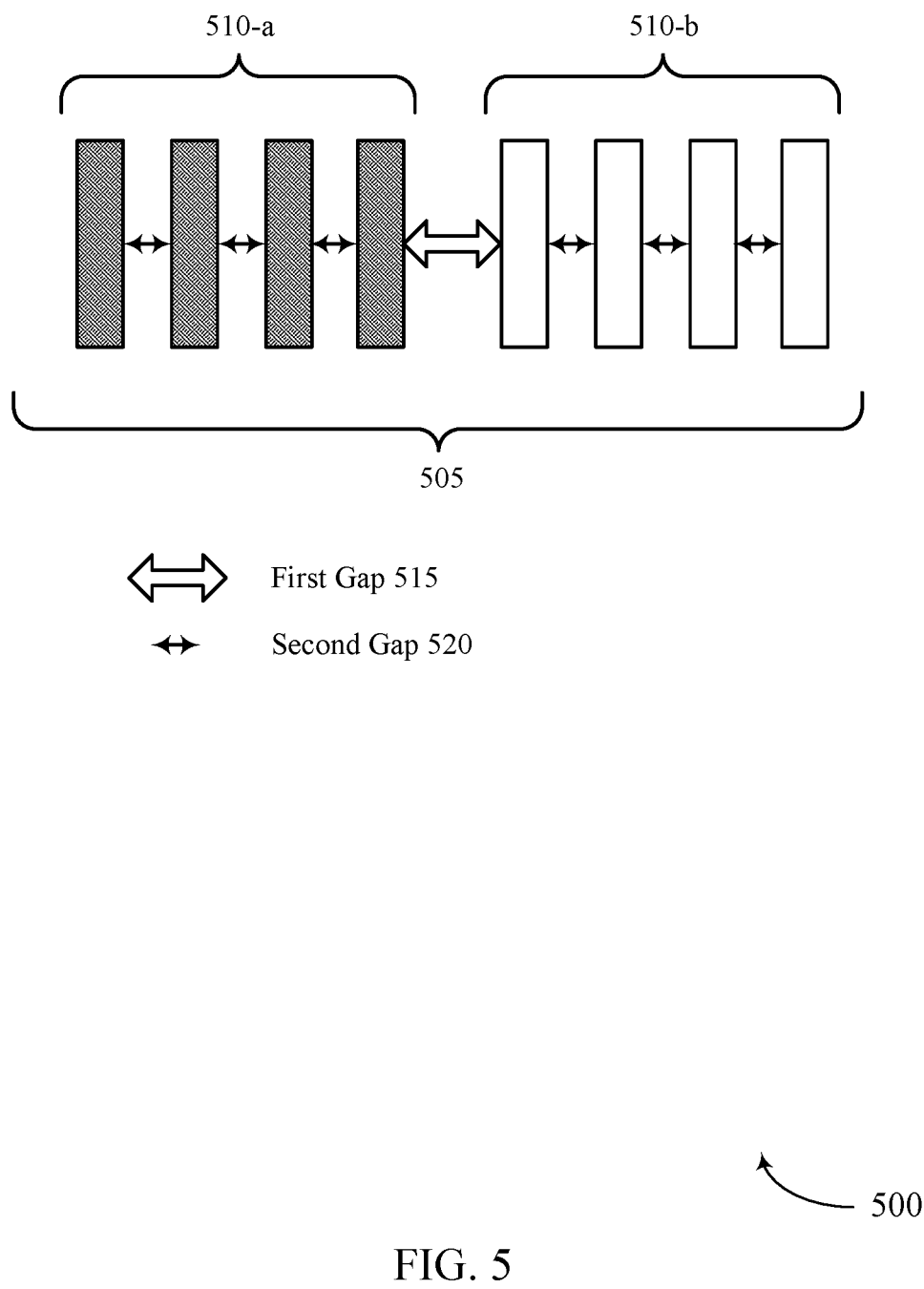
FIG. 5 illustrates an example of a resource configuration that supports reference signal patterns for beam management in accordance with aspects of the present disclosure.

FIG. 5 illustrates an example of a resource configuration 500 that supports reference signal patterns for beam management in accordance with aspects of the present disclosure. In some examples, resource configuration 500 may implement or be implemented by some aspects of wireless communications system 100 or 200. For example, resource configuration 500 may be an example of a configuration communicated from a base station 105 to a UE 115, which may be examples of the corresponding devices as described with reference to FIGS. 1 and 2. Resource configuration 500 may indicate an SRS resource set 505 and one or more time gaps, for example, as described with reference to FIG. 2.

In some cases, the UE 115 may indicate to the base station 105 (e.g., via UE capability signaling) whether a time gap (e.g., a first gap 515) is requested for transmit beam switching, for example, between SRS resources associated with different transmit beams (e.g., belonging to different groups 510). In some examples, the first gap 515 may have a fixed duration, such as a one symbol duration (e.g., one OFDM symbol duration), which may be applied based on the indication from the UE 115. In some examples, the UE 115 may indicate a value (e.g., an amount of time) for the first gap 515 to the base station, via the same signaling or different signaling. For example, the UE 115 may indicate a number of symbols (e.g., OFDM symbols) for transmit beam switching (e.g., if more than one symbol is used for transmit beam switching). The first gap 515 may, in some cases, be applicable to higher frequency bands with larger SCS, in which a cyclic prefix duration may be smaller and a timing of transmit beam switching may not be absorbed by the smaller cyclic prefix.

In some cases, the base station 105 may also use a time gap (e.g., a second gap 520) for adjusting a receive beam. The base station 105 may be configured with or determine the second gap 520 and may indicate the second gap 520 to the UE 115, for example, when configuring the SRS resource set 505. The second gap 520 may be applicable to gaps between SRS resources associated with different receive beams at the base station 105. The second gap 520 may be applicable to resources within a same group 510, as well as resources of different groups 510. For example, the second gap 520 (e.g., a time gap having a value equal to or greater than the second gap 520, such as the second gap 520 or the first gap 515) may be applied between an SRS transmission on a last resource of a group 510-a and an SRS transmission on a first resource of a group 510-b.

The configuration of the groups 510 of SRS resources within the SRS resource set 505 may take into account the first gap 515, the second gap 520, or both (e.g., as used by the UE 115 or the base station 105 for beam switching). Thus, the pattern of transmit and receive beam switching (and corresponding transmit and receive beam sweeping procedures) may be based on the configured groups 510 and may support any time gap(s) used for transmit beam switching, receive beam switching, or both. In some cases (e.g., when groups 510 are not contiguous time resources), such time gap(s) may still apply as described herein, for example, to resources associated with a same group 510 or resources associated with a different group 510.

According to the examples described herein, the UE 115 may transmit one or more SRS signals (e.g., using the SRS resource set 505) to the base station 105. For example, the UE 115 may transmit SRS signals on resources within a same group 510, having at least the second gap 520 between the SRS signals. The UE 115 may additionally or alternatively transmit SRS signals on resources within different groups 510, having the first gap 515 or the second gap 520 between the SRS signals. The base station 105 and the UE 115 may perform the corresponding beam switching (e.g., receive and transmit beam switching, respectively) in the corresponding time gaps. Based on the SRS signals, the base station 105 may determine a transmit beam and/or a receive beam for uplink communications may indicate the transmit beam to the UE 115. The UE 115 and the base station 105 may use the determined transmit and/or receive beams for uplink communications between the UE 115 and the base station 105, which may result in an increase in communication quality between the base station 105 and the UE 115.

Figure 6:
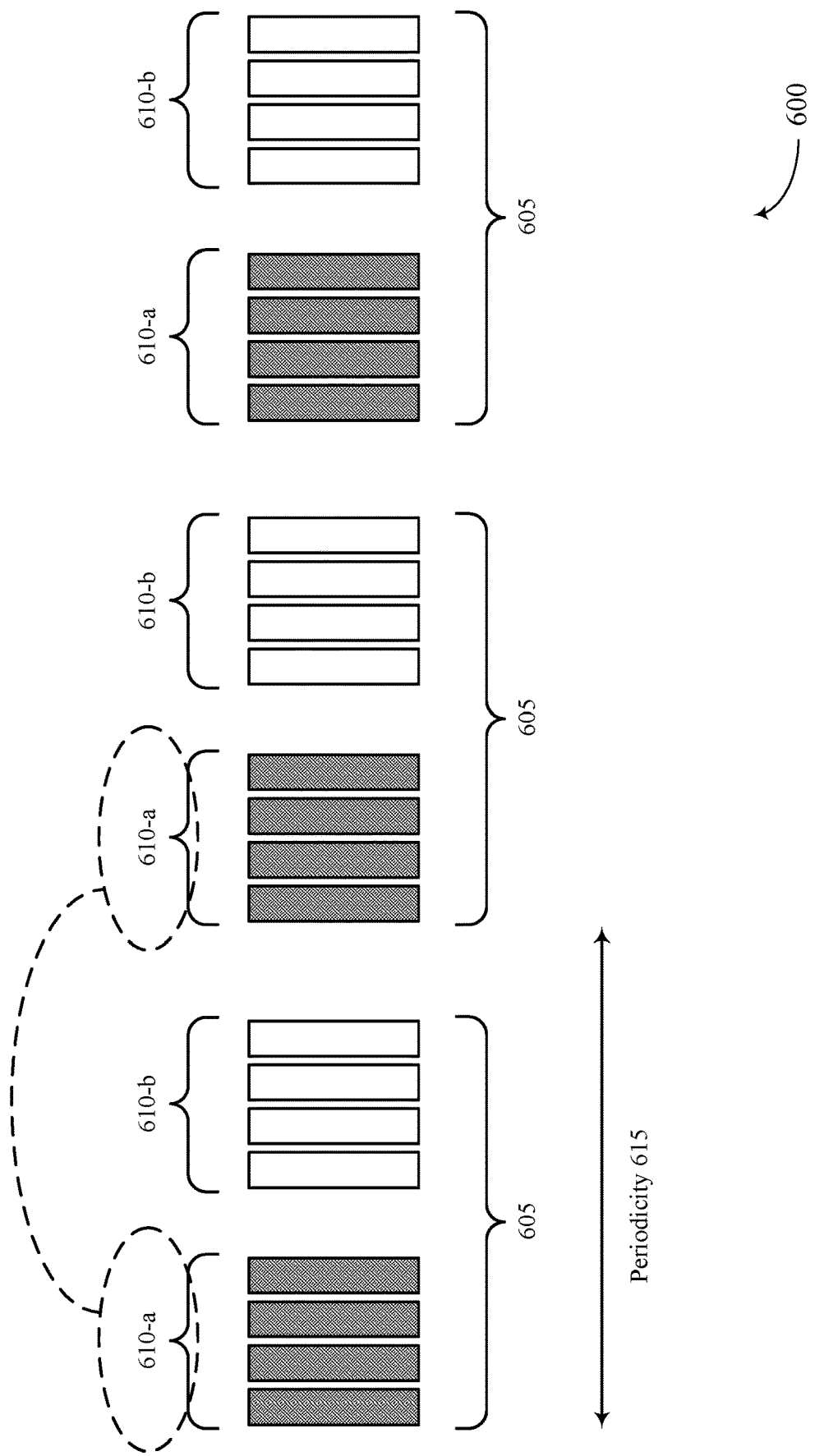
FIG. 6 illustrates an example of a resource configuration that supports reference signal patterns for beam management in accordance with aspects of the present disclosure.

FIG. 6 illustrates an example of a resource configuration 600 that supports reference signal patterns for beam management in accordance with aspects of the present disclosure. In some examples, resource configuration 600 may implement or be implemented by some aspects of wireless communications system 100 or 200. For example, resource configuration 600 may be an example of a configuration communicated from a base station 105 to a UE 115, which may be examples of the corresponding devices as described with reference to FIGS. 1-5. Resource configuration 600 may indicate an SRS resource set 605 and one or more groups 610 of SRS resources, for example, as described with reference to FIGS. 2 and 3. Resource configuration 600 may also indicate a transmit beam pattern for the SRS resource set 605 over one or more time periods.

For example, resource configuration 600 may indicate a beam consistency across different periodicities 615 for periodic SRS, semi-persistent SRS, or both (e.g., where the beam consistency may not be applicable to aperiodic SRS). A periodicity 615 may be configured per SRS resource (e.g., for periodic SRS and/or semi-persistent SRS) and may be the same across all SRS resources belonging to an SRS resource set 605. For SRS resources configured to be periodic and/or semi-persistent, the SRS resources may repeat in time (e.g., with the periodicity 615 between repetitions of same SRS resources). For example, an SRS resource set 605 may repeat after a defined periodicity 615. The resource configuration 600 may therefore indicate whether to use a same transmit beam across different periodicities 615 (e.g., for same groups 610 of SRS resources at the different periodicities 615, as repeated in time).

For a periodic and/or semi-persistent SRS resource set 605 with usage set to beam management, and configured with a periodicity (e.g., which defines one or more periods in which the SRS resource set 605 is located), the resource configuration 600 may therefore indicate how a transmit beam pattern is configured over multiple periodicities. In a first example, the transmit beam pattern may be defined within each period, and a same transmit beam may be used for an SRS resource across different periods. For example, a same transmit beam may be used for group 610-a of SRS resources across multiple periodicities 615. In this example, receive beam adjustment at the base station 105 may be performed across one or multiple periods (e.g., over one or more periodicities 615).

In a second example, the transmit beam pattern may be defined within each period, and the UE 115 may change the transmit beam used for an SRS resource across different periods. For example, the UE 115 may not be limited to using a same transmit beam across different periods for a group 610-a or 610-b, but may, in some cases, determine to do so. In a third example, the transmit beam pattern may be defined within each period, and a larger periodicity (e.g., a "mega-periodicity") may be defined to include an integer number of periodicities 615 (e.g., of periods). In such cases, a same transmit beam may be used for an SRS resource across different periods within the larger periodicity (e.g., for a first two repetitions), while the UE 115 may change the transmit beam used for an SRS resource across the larger periodicities (e.g., between the second and third repetitions).

In a fourth example, the resource configuration 600 may define the transmit beam pattern across different periodicities 615 or periods within a larger period (e.g., "mega-period") that includes multiple periods. For example, the resource configuration 600 may define which transmit beams (e.g., same or different transmit beams) to use for an SRS resource within each period of the larger period. In such cases, the resource configuration 600 may for example, indicate whether to use same or different transmit beams for a first repetition, second repetition, and so forth of the different groups 610 within the SRS resource set 605.

Figure 7:
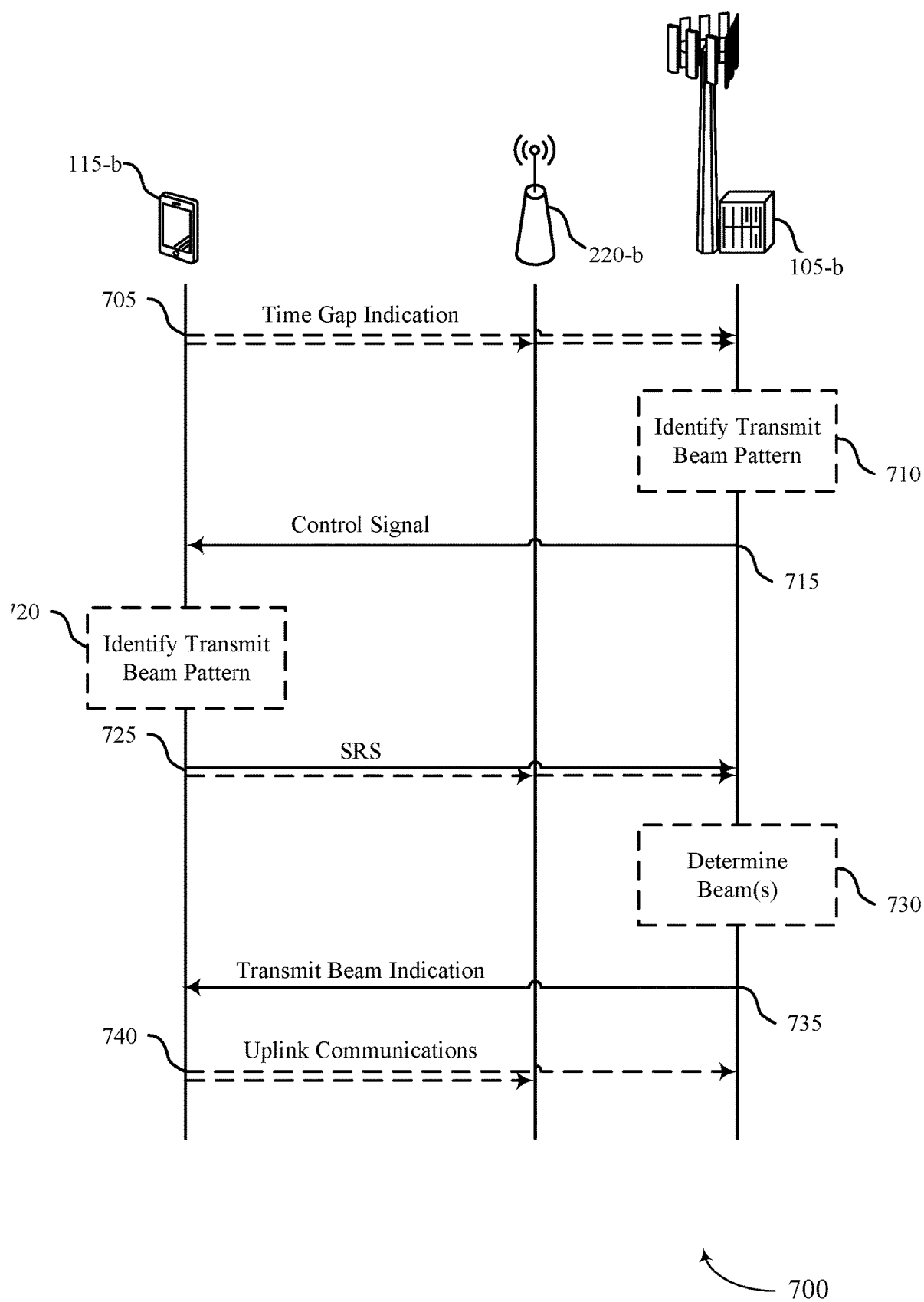
FIG. 7 illustrates an example of a process flow that supports reference signal patterns for beam management in accordance with aspects of the present disclosure.

FIG. 7 illustrates an example of a process flow 700 that supports reference signal patterns for beam management in accordance with aspects of the present disclosure. In some examples, process flow 700 may implement or be implemented by some aspects of wireless communications system 100 or 200, as well as one or more of resource configurations 300, 401, 402, 500, and 600. For example, process flow 700 may be implemented by a base station 105-*b* and UE 115-*b*, which may represent respective examples of a base station 105 and UEs 115 described with reference to FIGS. 1-6. In some cases, process flow may additionally be implemented by an uplink node 220-*b*, which may be an example of an uplink node 220 or 155 as described with reference to FIGS. 1 and 2. As described herein, base station 105-*b* may configure UE 115-*b* with a transmit beam pattern for one or more beam management SRS, where the SRS may be used to determine an uplink transmit beam for UE 115-*b*.

In the following description of process flow 700, the operations may be performed in a different order than the order shown, or the operations performed by UE 115-*b* and base station 105-*b* may be performed in different orders or at different times. For example, some operations may also be left out of process flow 700, or other operations may be added to process flow 700. As another example, operations shown as performed in a single instance (e.g., a single transmission) may in some cases be performed as multiple instances (e.g., multiple transmissions) over some duration of time. Although UE 115-*b* and base station 105-*b* are shown performing the operations of process flow 700, some aspects of some operations may also be performed by one or more other wireless devices. For example, some operations described as being performed by base station 105-*b* may additionally or alternatively be performed by another base station 105 or by uplink node 220-*b*.

At 705, in some cases, UE 115-*b* may transmit an indication of a first time gap to base station 105-*b* (e.g., directly, such as via an SUL, or by transmitting to uplink node 220-*b*). The first time gap may be a time gap between SRS resources within different SRS resource groups, and may represent a time gap for switching transmit beams at UE 115-*b*. As described herein, the indication of the first time gap may be transmitted via capability signaling.

At 710, in some cases, base station 105-*b* may identify a transmit beam pattern for an SRS resource set. The transmit beam pattern may, for example, identify one or more groups of SRS resources within the SRS resource set, where each SRS resource of an SRS resource group may share a same transmit beam (e.g., and where transmit beams may be different across different SRS groups). In some cases, the one or more groups of SRS resources may be based on a time domain position of the SRS resources of the SRS resource set, and a number of SRS resources per group. For example, each group of SRS resources may include resources that are consecutive in time, for the number of resources per group. In some cases, the one or more groups of SRS resources may be based on SRS resource ID of each of the SRS resources of the SRS resource set, and a number of SRS resources per group. For example, each group of SRS resources may include resources that are consecutive with respect to SRS resource IDs, for the number of resources per group. Grouping techniques for the transmit beam pattern are further described with reference to FIGS. 4A and 4B.

At 715, base station 105-*b* may transmit, to UE 115-*b*, a control signal that indicates an SRS beam management configuration that identifies one or more SRS resource groups within the SRS resource set. The control signal may, for example, identify the transmit beam pattern that indicates a respective transmit beam for each of the one or more SRS resource groups, as described herein with reference to FIGS. 2-6. For example, as described herein, each group of SRS resources may be associated with a transmit beam (e.g., a same transmit beam), for transmitting SRS via the resources and different groups of SRS resources may be associated with different transmit beams.

In some cases, as described herein with reference to FIGS. 4A and 4B, the control signal may additionally indicate the one or more SRS resource groups by indicating a number of SRS resources in each of the one or more groups, by indicating a number of the one or more SRS groups within the SRS resource set, or both. The groups of SRS resources, and the corresponding transmit beam pattern for SRS on the SRS resource set, may be based on (e.g., identified using) the number of resources or the number of groups.

In some cases, as described herein with reference to FIG. 5, the control signal may additionally indicate a second time gap, where the second time gap may be applicable between SRS resources within a same SRS group. The second time gap may represent a time gap for adjusting a receive beam at base station 105-*b*. In some cases, the control signal, or other control signaling, may indicate a power control adjustment state for the SRS resource set. For example, base station 105-*b* may configure UE 115-*b* with a power control adjustment state for the SRS resource set (e.g., a "separate-ClosedLoop" in srs-PowerControlAdjustmentStates) that may be different from a PUSCH power control adjustment state (e.g., power control may be decoupled for PUSCH and SRS). In such cases, configuring the SRS resource set to use a same power control adjustment state as a PUSCH may be an invalid configuration (e.g., as defined by the network or by a wireless communications standard).

In some cases, the control signaling may represent a MAC-CE, for example, if base station 105-*b* configures the SRS resource set as a semi-persistent SRS resource set. In such cases, the MAC-CE may indicate or update spatial relation information for each SRS resource within the SRS resource set. In some cases, such spatial relation information may not be used by UE 115-*b* if the usage of the SRS resource set is set to beam management. For example, in such cases, selection of an uplink transmit beam may be performed by UE 115-*b* (e.g., instead of being indicated by the MAC-CE). In cases where the spatial relationship information is not used by UE 115-*b* any fields that include this information may increase overhead and may cause potential problems at UE 115-*b* (e.g., because UE 115-*b* may not expect the spatial relationship information for beam management SRS).

Accordingly, in some cases (e.g., if a MAC-CE activates a semi-persistent SRS resource set), a field or bit of the MAC-CE may be used to indicate whether the MAC-CE includes fields (e.g., octets) related to spatial relation information (e.g., updated spatial relationship information for SRS resources of the SRS resource set). In some cases, such an indication may be one or more reserved bits in the MAC-CE. The indication of whether the spatial relation information is included may be applicable to SRS resource sets that are configured with usage set to beam management, or may be applicable to one or more other SRS resource sets (e.g., may be applicable in general, such as in frequency range 1 (FR1), if spatial relation information is not needed for one or more other usages of SRS resource sets). If the field or bit of the MAC-CE used for the indication is set to a value (e.g., '1'), the octets and/or fields related to spatial relation information updates may be present in the MAC-CE, and otherwise they may not be present.

At 720, in some cases, UE 115-*b* may identify the transmit beam pattern for the SRS resource set, for example, based on the received control signal. As described herein, in some cases, the one or more groups of SRS resources may be based on a time domain position of the SRS resources of the SRS resource set, and a number of SRS resources per group. For example, each group of SRS resources may include resources that are consecutive in time, for the number of resources per group. In some cases, the one or more groups of SRS resources may be based on SRS resource ID of each of the SRS resources of the SRS resource set, and a number of SRS resources per group. For example, each group of SRS resources may include resources that are consecutive with respect to SRS resource IDs, for the number of resources per group. Grouping techniques for the transmit beam pattern are further described with reference to FIGS. 4A and 4B.

At 725, UE 115-*b* may transmit one or more SRS each using a corresponding SRS resource of the SRS resource set, and using a corresponding transmit beam based on an SRS resource group to which the corresponding SRS resource belongs, in accordance with the SRS beam management configuration. UE 115-*b* may transmit the one or more SRS to base station 105-*b* (e.g., via an SUL carrier) or may transmit the one or more SRS to uplink node 220-*b* (e.g., which may forward an indication of the one or more SRS to base station 105-*b*). In some cases, UE 115-*b* may transmit the one or more SRS according to the transmit beam pattern and over one or more periods, or one or more periodicities, as described with reference to FIG. 6.

As described with reference to FIG. 5, UE 115-*b* may transmit the one or more SRS according to the first time gap, the second time gap, or both. For example, in each group of SRS resources, UE 115-*b* may transmit the one or more SRS with at least the first time gap between each of the SRS resources of the group. Additionally or alternatively, UE 115-*b* may transmit SRS associated with different resource groups with at least the second time gap between the SRS.

In some cases, UE 115-*b* may delay power control adjustment until after transmission of all SRS associated with the SRS resource set. For example, UE 115-*b* may update the power control adjustment (e.g., based on a TPC command) at a beginning of a first transmitted SRS (e.g., within a first resource of the SRS resource set) and may refrain from performing power control adjustments for any other SRS transmitted using resources of the SRS resource set (e.g., refrain from performing power control adjustments between transmission of SRS). UE 115-*b* may also refrain from performing power control adjustments for PUSCH within a same time period (e.g., overlapping with the SRS resource set), for example, if a power control adjustment state is common, or shared, between the SRS resource set and the PUSCH.

In some cases, UE 115-*b* may not expect to receive a DCI with a TPC command (e.g., that results in a transmit power change) within an instance of SRS transmissions using different SRS resources within the SRS resource set. For example, receiving such TPC commands (e.g., which result in applying the TPC command within the SRS resource set) may be defined as an error case (e.g., by a wireless communications standard), and UE 115-*b* may ignore or disregard such TPC commands.

Base station 105-*b* may receive the one or more SRS according to the transmit beam pattern. For example, base station 105-*b* may configure a respective receive beam for each SRS resource (e.g., and corresponding SRS) within an SRS group.

At 730, in some cases, base station 105-*b* may determine a first transmit beam for UE 115-*b* to use for uplink communications. The first transmit beam may be one of the respective transmit beams of the transmit beam pattern. Base station 105-*b* may determine or select the first transmit beam based on a signal quality of the one or more transmitted SRS. For example, the first transmit beam may be associated with an SRS resource that is used by base station 105-*b* to receive an SRS with a highest signal quality or received power. Additionally or alternatively, base station 105-*b* may determine or select a first receive beam (e.g., of the respective receive beams used by base station 105-*b*) for uplink communications with UE 115-*b*. For example, the first receive beam may be associated with an SRS resource that is used by base station 105-*b* to receive an SRS with a highest signal quality or received power.

At 735, base station 105-*b* may transmit, to UE 115-*b*, an indication of the first transmit beam. For example, base station 105-*b* may indicate a resource ID of an SRS resource associated with the first transmit beam, or may indicate a resource group ID of an SRS resource group associated with the first transmit beam (e.g., because each group may be associated with a same transmit beam).

At 740, UE 115-*b* and base station 105-*b* (e.g., base station 105-*b* or uplink node 220-*b*) may communicate in the uplink using the first transmit beam and/or the first receive beam. For example, UE 115-*b* may transmit one or more uplink communications to base station 105-*b* (e.g., or to uplink node 220-*b*) using the first transmit beam, and base station 105-*b* (e.g., uplink node 220-*b*) may attempt to receive the one or more uplink communications from UE 115-*b* using the first receive beam.

Figure 8:
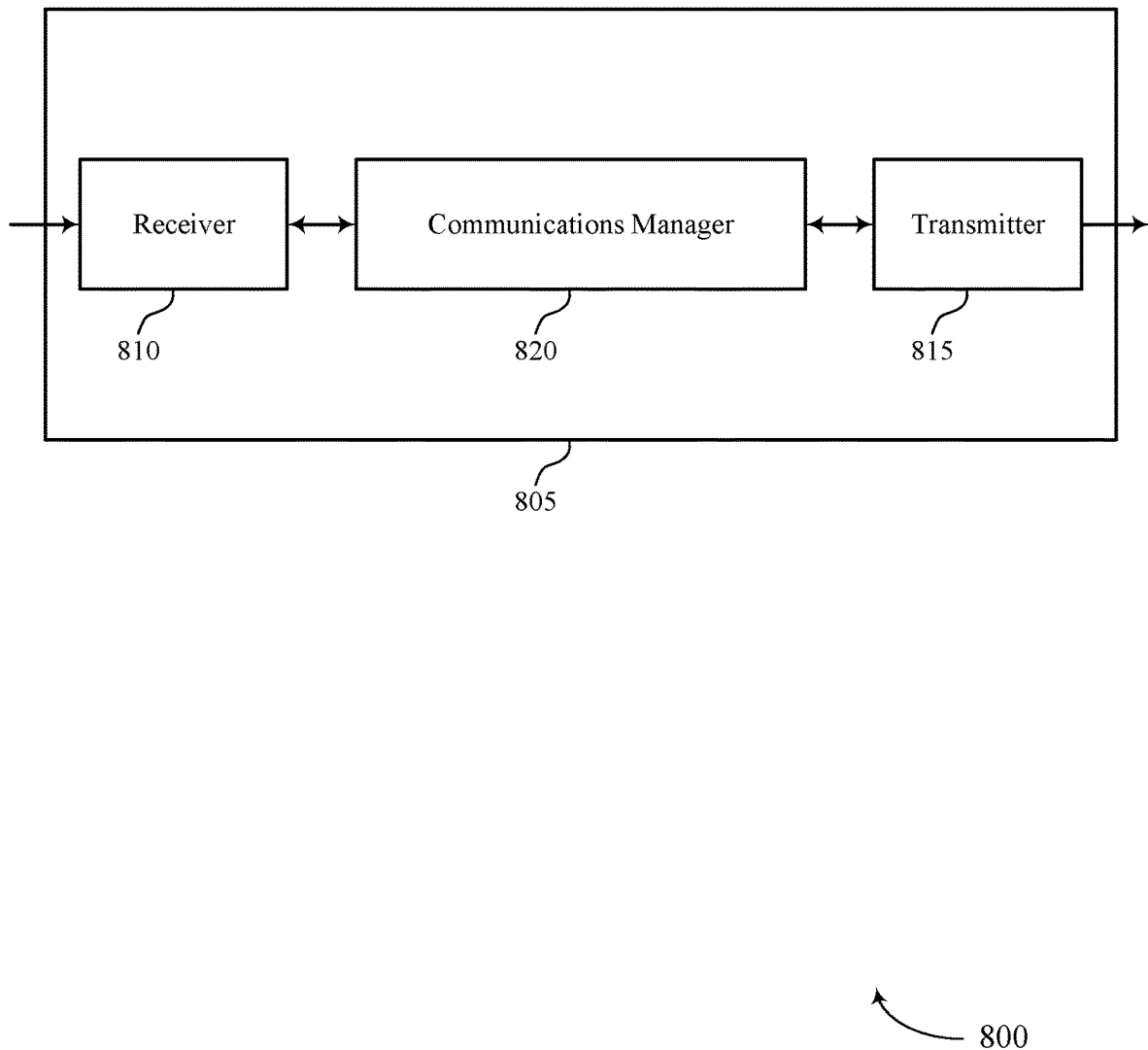
FIGS. 8 and 9 show block diagrams of devices that support reference signal patterns for beam management in accordance with aspects of the present disclosure.

FIG. 8 shows a block diagram 800 of a device 805 that supports reference signal patterns for beam management in accordance with aspects of the present disclosure. The device 805 may be an example of aspects of a UE 115 as described herein. The device 805 may include a receiver 810, a transmitter 815, and a communications manager 820. The device 805 may also include one or more processors, memory coupled with the one or more processors, and instructions stored in the memory that are executable by the one or more processors to enable the one or more processors to perform the reference signal patterns for beam management discussed herein. Each of these components may be in communication with one another (e.g., via one or more buses).

The receiver 810 may provide a means for receiving information such as packets, user data, control information, or any combination thereof associated with various information channels (e.g., control channels, data channels, information channels related to reference signal patterns for beam management). Information may be passed on to other components of the device 805. The receiver 810 may utilize a single antenna or a set of multiple antennas.

The transmitter 815 may provide a means for transmitting signals generated by other components of the device 805. For example, the transmitter 815 may transmit information such as packets, user data, control information, or any combination thereof associated with various information channels (e.g., control channels, data channels, information channels related to reference signal patterns for beam management). In some examples, the transmitter 815 may be co-located with a receiver 810 in a transceiver module. The transmitter 815 may utilize a single antenna or a set of multiple antennas.

The communications manager 820, the receiver 810, the transmitter 815, or various combinations thereof or various components thereof may be examples of means for performing various aspects of reference signal patterns for beam management as described herein. For example, the communications manager 820, the receiver 810, the transmitter 815, or various combinations or components thereof may support a method for performing one or more of the functions described herein.

In some examples, the communications manager 820, the receiver 810, the transmitter 815, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 820, the receiver 810, the transmitter 815, or various combinations or components thereof may be implemented in code (e.g., as communications management software or firmware) executed by a processor. If implemented in code executed by a processor, the functions of the communications manager 820, the receiver 810, the transmitter 815, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 820 may be configured to perform various operations (e.g., receiving, monitoring, transmitting) using or otherwise in cooperation with the receiver 810, the transmitter 815, or both. For example, the communications manager 820 may receive information from the receiver 810, send information to the transmitter 815, or be integrated in combination with the receiver 810, the transmitter 815, or both to receive information, transmit information, or perform various other operations as described herein.

The communications manager 820 may support wireless communication at a UE in accordance with examples as disclosed herein. For example, the communications manager 820 may be configured as or otherwise support a means for receiving, from a base station, a control signal that indicates a SRS beam management configuration that identifies one or more SRS resource groups within a SRS resource set and a transmit beam pattern that indicates a respective transmit beam for each of the one or more SRS resource groups. The communications manager 820 may be configured as or otherwise support a means for transmitting one or more SRS each using a corresponding SRS resource of the SRS resource set and using a corresponding transmit beam based on a SRS resource group to which the corresponding SRS resource belongs, in accordance with the SRS beam management configuration. The communications manager 820 may be configured as or otherwise support a means for receiving, from the base station, an indication of a first transmit beam of the respective transmit beams that the UE is to use for uplink communications.

The actions performed by the communications manager 820, among other examples herein, may be implemented to realize one or more potential advantages. For example, communications manager 820 may increase available battery power and communication quality at a wireless device (e.g., a UE 115) by supporting transmit beam patterns within a configured SRS resource set. The increase in communication quality may result in increased link performance and decreased overhead based on using a configured SRS resource set, and corresponding transmit beam pattern, for transmission of one or more SRS. Accordingly, communications manager 820 may save power and increase battery life at a wireless device (e.g., a UE 115) by strategically increasing a quality of communications at a wireless device (e.g., a UE 115).

Figure 9:
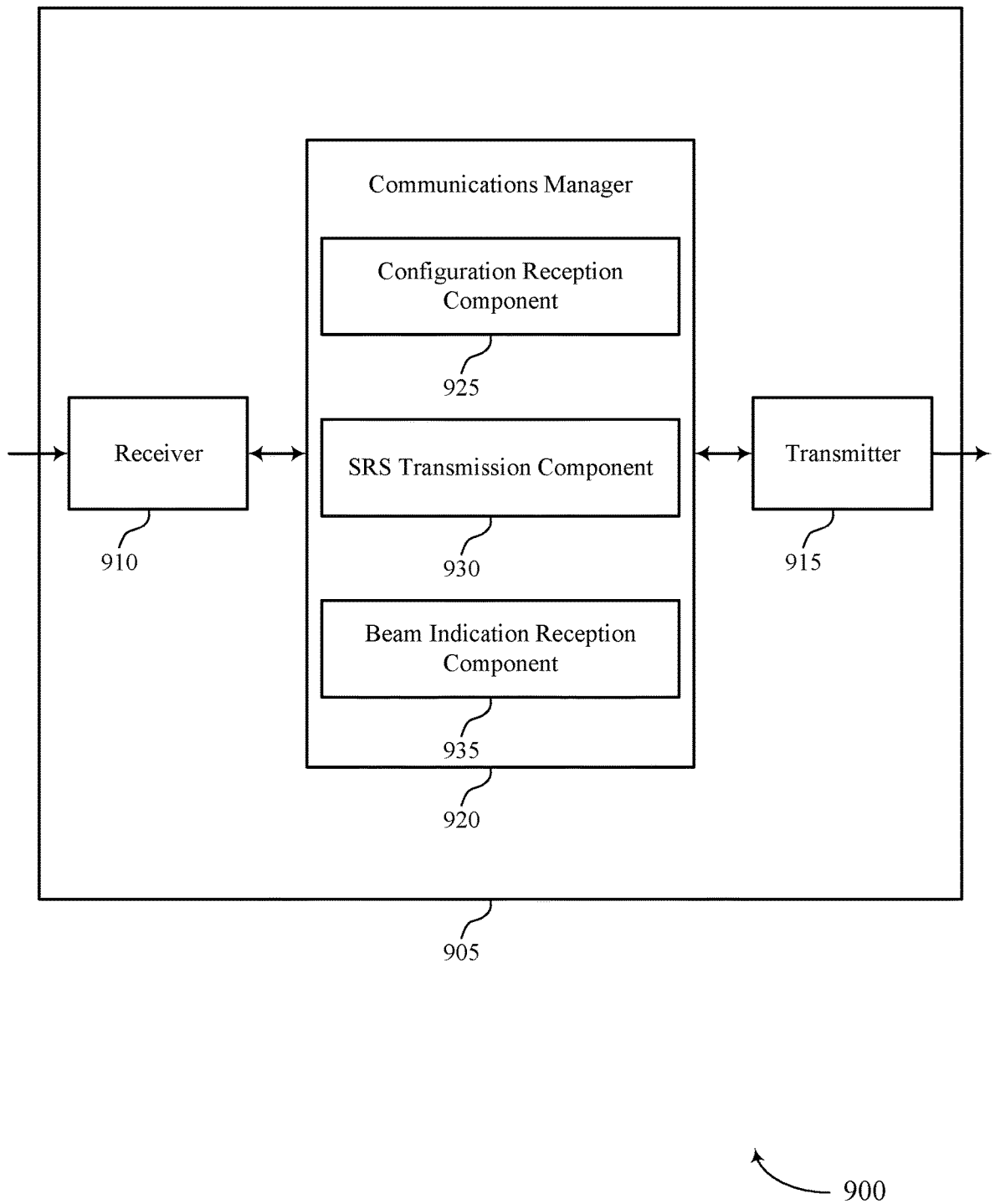

FIG. 9 shows a block diagram 900 of a device 905 that supports reference signal patterns for beam management in accordance with aspects of the present disclosure. The device 905 may be an example of aspects of a device 805 or a UE 115 as described herein. The device 905 may include a receiver 910, a transmitter 915, and a communications manager 920. The device 905 may also include a processor. Each of these components may be in communication with one another (e.g., via one or more buses).

The receiver 910 may provide a means for receiving information such as packets, user data, control information, or any combination thereof associated with various information channels (e.g., control channels, data channels, information channels related to reference signal patterns for beam management). Information may be passed on to other components of the device 905. The receiver 910 may utilize a single antenna or a set of multiple antennas.

The transmitter 915 may provide a means for transmitting signals generated by other components of the device 905. For example, the transmitter 915 may transmit information such as packets, user data, control information, or any combination thereof associated with various information channels (e.g., control channels, data channels, information channels related to reference signal patterns for beam management). In some examples, the transmitter 915 may be co-located with a receiver 910 in a transceiver module. The transmitter 915 may utilize a single antenna or a set of multiple antennas.

The device 905, or various components thereof, may be an example of means for performing various aspects of reference signal patterns for beam management as described herein. For example, the communications manager 920 may include a configuration reception component 925, an SRS transmission component 930, a beam indication reception component 935, or any combination thereof. The communications manager 920 may be an example of aspects of a communications manager 820 as described herein. In some examples, the communications manager 920, or various components thereof, may be configured to perform various operations (e.g., receiving, monitoring, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to receive information, transmit information, or perform various other operations as described herein.

The communications manager 920 may support wireless communication at a UE in accordance with examples as disclosed herein. The configuration reception component 925 may be configured as or otherwise support a means for receiving, from a base station, a control signal that indicates a SRS beam management configuration that identifies one or more SRS resource groups within a SRS resource set and a transmit beam pattern that indicates a respective transmit beam for each of the one or more SRS resource groups. The SRS transmission component 930 may be configured as or otherwise support a means for transmitting one or more SRS each using a corresponding SRS resource of the SRS resource set and using a corresponding transmit beam based on a SRS resource group to which the corresponding SRS resource belongs, in accordance with the SRS beam management configuration. The beam indication reception component 935 may be configured as or otherwise support a means for receiving, from the base station, an indication of a first transmit beam of the respective transmit beams that the UE is to use for uplink communications.

A processor of a wireless device (e.g., controlling the receiver 910, the transmitter 915, or the transceiver 1115 as described with reference to FIG. 11) may increase available battery power and communication quality. The increased communication quality may increase available battery power and throughput (e.g., via implementation of system components described with reference to FIG. 10) compared to other systems and techniques, for example, that do not support transmit beam patterns within a configured SRS resource set. Further, the processor of the wireless device may identify one or more aspects of the SRS resource set and corresponding transmit beam pattern, which may result in increased communication quality, as well as save power and increase battery life at the wireless device (e.g., by strategically supporting transmit beam patterns within transmitted SRS), among other benefits.

In some cases, the configuration reception component 925, the SRS transmission component 930, and the beam indication reception component 935 may each be or be at least a part of a processor (e.g., a transceiver processor, or a radio processor, or a transmitter processor, or a receiver processor). The processor may be coupled with memory and execute instructions stored in the memory that enable the processor to perform or facilitate the features of the configuration reception component 925, the SRS transmission component 930, and the beam indication reception component 935 discussed herein. A transceiver processor may be collocated with and/or communicate with (e.g., direct the operations of) a transceiver of the device. A radio processor may be collocated with and/or communicate with (e.g., direct the operations of) a radio (e.g., an NR radio, an LTE radio, a Wi-Fi radio) of the device. A transmitter processor may be collocated with and/or communicate with (e.g., direct the operations of) a transmitter of the device. A receiver processor may be collocated with and/or communicate with (e.g., direct the operations of) a receiver of the device.

Figure 10:
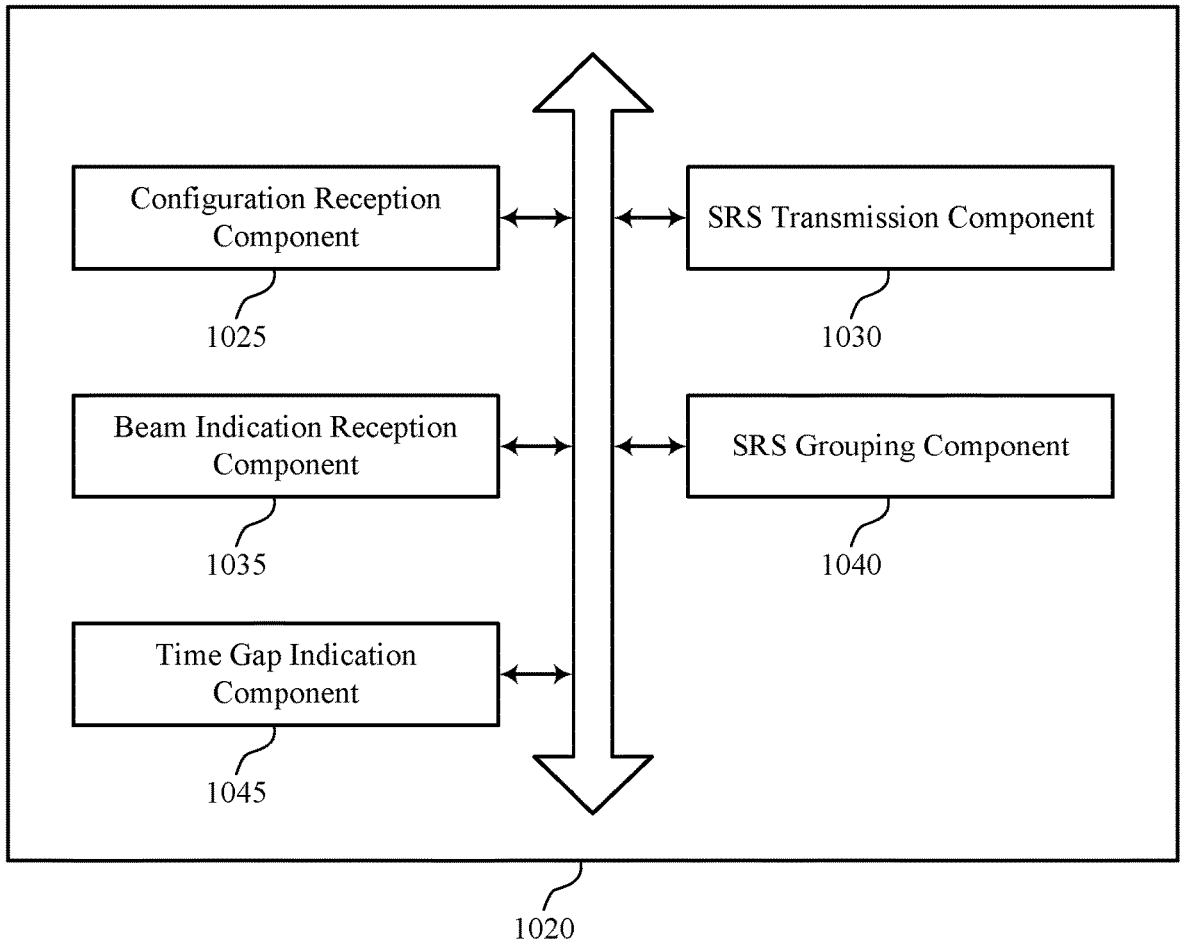
FIG. 10 shows a block diagram of a communications manager that supports reference signal patterns for beam management in accordance with aspects of the present disclosure.

FIG. 10 shows a block diagram 1000 of a communications manager 1020 that supports reference signal patterns for beam management in accordance with aspects of the present disclosure. The communications manager 1020 may be an example of aspects of a communications manager 820, a communications manager 920, or both, as described herein. The communications manager 1020, or various components thereof, may be an example of means for performing various aspects of reference signal patterns for beam management as described herein. For example, the communications manager 1020 may include a configuration reception component 1025, an SRS transmission component 1030, a beam indication reception component 1035, an SRS grouping component 1040, a time gap indication component 1045, or any combination thereof. Each of these components may communicate, directly or indirectly, with one another (e.g., via one or more buses).

The communications manager 1020 may support wireless communication at a UE in accordance with examples as disclosed herein. The configuration reception component 1025 may be configured as or otherwise support a means for receiving, from a base station, a control signal that indicates a SRS beam management configuration that identifies one or more SRS resource groups within a SRS resource set and a transmit beam pattern that indicates a respective transmit beam for each of the one or more SRS resource groups. The SRS transmission component 1030 may be configured as or otherwise support a means for transmitting one or more SRS each using a corresponding SRS resource of the SRS resource set and using a corresponding transmit beam based on a SRS resource group to which the corresponding SRS resource belongs, in accordance with the SRS beam management configuration. The beam indication reception component 1035 may be configured as or otherwise support a means for receiving, from the base station, an indication of a first transmit beam of the respective transmit beams that the UE is to use for uplink communications.

In some examples, to support receiving the control signal that indicates the SRS beam management configuration, the configuration reception component 1025 may be configured as or otherwise support a means for receiving, via the control signal, an additional indication of a number of SRS resources in each of the one or more SRS resource groups, where the transmit beam pattern is based on the number of SRS resources in each of the one or more SRS resource groups. In some examples, to support receiving the control signal that indicates the SRS beam management configuration, the configuration reception component 1025 may be configured as or otherwise support a means for receiving, via the control signal, an additional indication of a number of the one or more SRS resource groups in the SRS resource set, where the transmit beam pattern is based on the number of the one or more SRS resource groups.

In some examples, the SRS grouping component 1040 may be configured as or otherwise support a means for identifying the one or more SRS resource groups based on a time domain position of SRS resources of the SRS resource set and a number of SRS resources for each of the one or more SRS resource groups, where the transmit beam pattern is based on identifying the one or more SRS resource groups. In some examples, the SRS grouping component 1040 may be configured as or otherwise support a means for identifying the one or more SRS resource groups based on an additional identifier of each SRS resource of the SRS resource set and a number of SRS resources for each of the one or more SRS resource groups, where the transmit beam pattern is based on identifying the one or more SRS resource groups.

In some examples, to support receiving the control signal that indicates the SRS beam management configuration, the configuration reception component 1025 may be configured as or otherwise support a means for receiving, via the control signal, an additional indication of a time gap between SRS resources within a same SRS resource group of the one or more SRS resource groups, where transmitting the one or more SRS is based on the time gap. In some examples, to support transmitting the one or more SRS, the SRS transmission component 1030 may be configured as or otherwise support a means for transmitting the one or more SRS each using the corresponding SRS resource within a first SRS resource group of the one or more SRS resource groups with at least the time gap between each of the SRS resources of the first SRS resource group.

In some examples, the time gap indication component 1045 may be configured as or otherwise support a means for transmitting an additional indication of a time gap between SRS resources within different SRS resource groups of the one or more SRS resource groups, where transmitting the one or more SRS is based on the time gap. In some examples, to support transmitting the one or more SRS, the SRS transmission component 1030 may be configured as or otherwise support a means for transmitting a first SRS using a corresponding first SRS resource of a first SRS resource group of the one or more SRS resource groups. In some examples, to support transmitting the one or more SRS, the SRS transmission component 1030 may be configured as or otherwise support a means for transmitting a second SRS using a corresponding second SRS resource of a second SRS resource group of the one or more SRS resource groups with at least the time gap between the first SRS resource and the second SRS resource.

In some examples, to support transmitting the one or more SRS, the SRS transmission component 1030 may be configured as or otherwise support a means for refraining from performing a power control adjustment between transmission of SRS using the corresponding SRS resources of the SRS resource set. In some examples, to support receiving the control signal that indicates the SRS beam management configuration, the configuration reception component 1025 may be configured as or otherwise support a means for receiving, via the control signal, an additional indication of a power control adjustment state for the SRS resource set, where transmitting the one or more SRS is based on the power control adjustment state.

In some examples, to support receiving the control signal that indicates the SRS beam management configuration, the configuration reception component 1025 may be configured as or otherwise support a means for receiving the control signal configuring the SRS resource set as a semi-persistent SRS resource set, the control signal including a field indicating whether the control signal includes spatial relationship information for the SRS resource set.

In some examples, the SRS transmission component 1030 may be configured as or otherwise support a means for transmitting the one or more SRS during a first period and based on the transmit beam pattern indicated by the SRS beam management configuration. In some examples, the SRS transmission component 1030 may be configured as or otherwise support a means for transmitting additional SRS during a second period using respective transmit beams that are based on the transmit beam pattern indicated by the SRS beam management configuration.

In some examples, to support receiving the indication of the first transmit beam, the beam indication reception component 1035 may be configured as or otherwise support a means for receiving signaling indicative of a first SRS resource group of the one or more SRS resource groups, where the first SRS resource group is associated with the first transmit beam.

In some examples, to support transmitting the one or more SRS, the SRS transmission component 1030 may be configured as or otherwise support a means for transmitting the one or more SRS towards an uplink node or via a supplementary uplink carrier.

In some cases, the configuration reception component 1025, the SRS transmission component 1030, the beam indication reception component 1035, the SRS grouping component 1040, and the time gap indication component 1045 may each be or be at least a part of a processor (e.g., a transceiver processor, or a radio processor, or a transmitter processor, or a receiver processor). The processor may be coupled with memory and execute instructions stored in the memory that enable the processor to perform or facilitate the features of the configuration reception component 1025, the SRS transmission component 1030, the beam indication reception component 1035, the SRS grouping component 1040, and the time gap indication component 1045 discussed herein.

Figure 11:
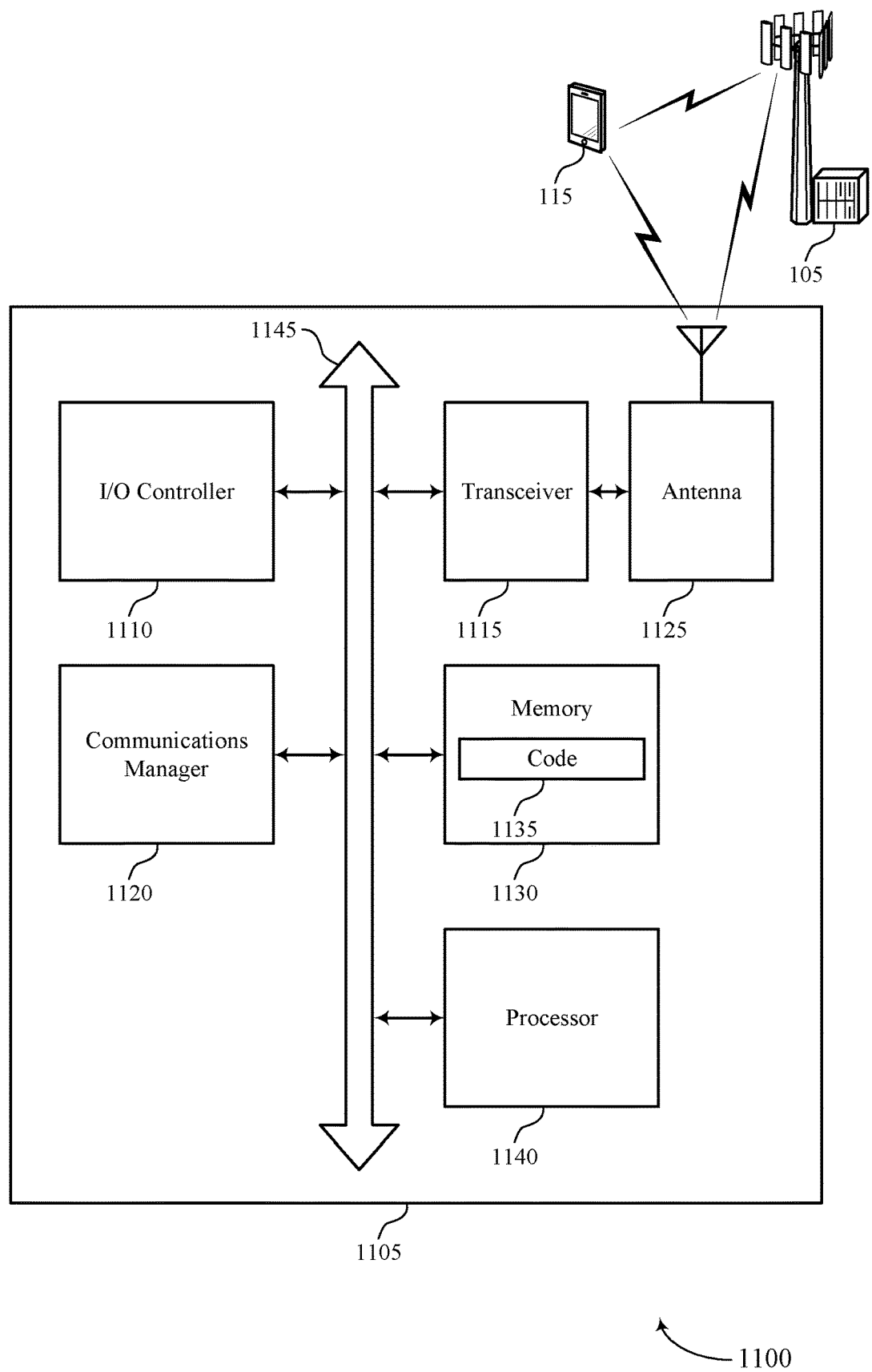
FIG. 11 shows a diagram of a system including a device that supports reference signal patterns for beam management in accordance with aspects of the present disclosure.

FIG. 11 shows a diagram of a system 1100 including a device 1105 that supports reference signal patterns for beam management in accordance with aspects of the present disclosure. The device 1105 may be an example of or include the components of a device 805, a device 905, or a UE 115 as described herein. The device 1105 may communicate wirelessly with one or more base stations 105, UEs 115, or any combination thereof. The device 1105 may include components for bi-directional voice and data communications including components for transmitting and receiving communications, such as a communications manager 1120, an input/output (I/O) controller 1110, a transceiver 1115, an antenna 1125, a memory 1130, code 1135, and a processor 1140. These components may be in electronic communication or otherwise coupled (e.g., operatively, communicatively, functionally, electronically, electrically) via one or more buses (e.g., a bus 1145).

The I/O controller 1110 may manage input and output signals for the device 1105. The I/O controller 1110 may also manage peripherals not integrated into the device 1105. In some cases, the I/O controller 1110 may represent a physical connection or port to an external peripheral. In some cases, the I/O controller 1110 may utilize an operating system such as iOS®, ANDROID®, MS-DOS®, MS-WINDOWS®, OS/2®, UNIX®, LINUX®, or another known operating system. Additionally or alternatively, the I/O controller 1110 may represent or interact with a modem, a keyboard, a mouse, a touchscreen, or a similar device. In some cases, the I/O controller 1110 may be implemented as part of a processor, such as the processor 1140. In some cases, a user may interact with the device 1105 via the I/O controller 1110 or via hardware components controlled by the I/O controller 1110.

In some cases, the device 1105 may include a single antenna 1125. However, in some other cases, the device 1105 may have more than one antenna 1125, which may be capable of concurrently transmitting or receiving multiple wireless transmissions. The transceiver 1115 may communicate bi-directionally, via the one or more antennas 1125, wired, or wireless links as described herein. For example, the transceiver 1115 may represent a wireless transceiver and may communicate bi-directionally with another wireless transceiver. The transceiver 1115 may also include a modem to modulate the packets, to provide the modulated packets to one or more antennas 1125 for transmission, and to demodulate packets received from the one or more antennas 1125. The transceiver 1115, or the transceiver 1115 and one or more antennas 1125, may be an example of a transmitter 815, a transmitter 915, a receiver 810, a receiver 910, or any combination thereof or component thereof, as described herein.

The memory 1130 may include random access memory (RAM) and read-only memory (ROM). The memory 1130 may store computer-readable, computer-executable code 1135 including instructions that, when executed by the processor 1140, cause the device 1105 to perform various functions described herein. The code 1135 may be stored in a non-transitory computer-readable medium such as system memory or another type of memory. In some cases, the code 1135 may not be directly executable by the processor 1140 but may cause a computer (e.g., when compiled and executed) to perform functions described herein. In some cases, the memory 1130 may contain, among other things, a basic I/O system (BIOS) which may control basic hardware or software operation such as the interaction with peripheral components or devices.

The processor 1140 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1140 may be configured to operate a memory array using a memory controller. In some other cases, a memory controller may be integrated into the processor 1140. The processor 1140 may be configured to execute computer-readable instructions stored in a memory (e.g., the memory 1130) to cause the device 1105 to perform various functions (e.g., functions or tasks supporting reference signal patterns for beam management). For example, the device 1105 or a component of the device 1105 may include a processor 1140 and memory 1130 coupled to the processor 1140, the processor 1140 and memory 1130 configured to perform various functions described herein.

The communications manager 1120 may support wireless communication at a UE in accordance with examples as disclosed herein. For example, the communications manager 1120 may be configured as or otherwise support a means for receiving, from a base station, a control signal that indicates a SRS beam management configuration that identifies one or more SRS resource groups within a SRS resource set and a transmit beam pattern that indicates a respective transmit beam for each of the one or more SRS resource groups. The communications manager 1120 may be configured as or otherwise support a means for transmitting one or more SRS each using a corresponding SRS resource of the SRS resource set and using a corresponding transmit beam based on a SRS resource group to which the corresponding SRS resource belongs, in accordance with the SRS beam management configuration. The communications manager 1120 may be configured as or otherwise support a means for receiving, from the base station, an indication of a first transmit beam of the respective transmit beams that the UE is to use for uplink communications.

In some examples, the communications manager 1120 may be configured to perform various operations (e.g., receiving, monitoring, transmitting) using or otherwise in cooperation with the transceiver 1115, the one or more antennas 1125, or any combination thereof. Although the communications manager 1120 is illustrated as a separate component, in some examples, one or more functions described with reference to the communications manager 1120 may be supported by or performed by the processor 1140, the memory 1130, the code 1135, or any combination thereof. For example, the code 1135 may include instructions executable by the processor 1140 to cause the device 1105 to perform various aspects of reference signal patterns for beam management as described herein, or the processor 1140 and the memory 1130 may be otherwise configured to perform or support such operations.

Figure 12:
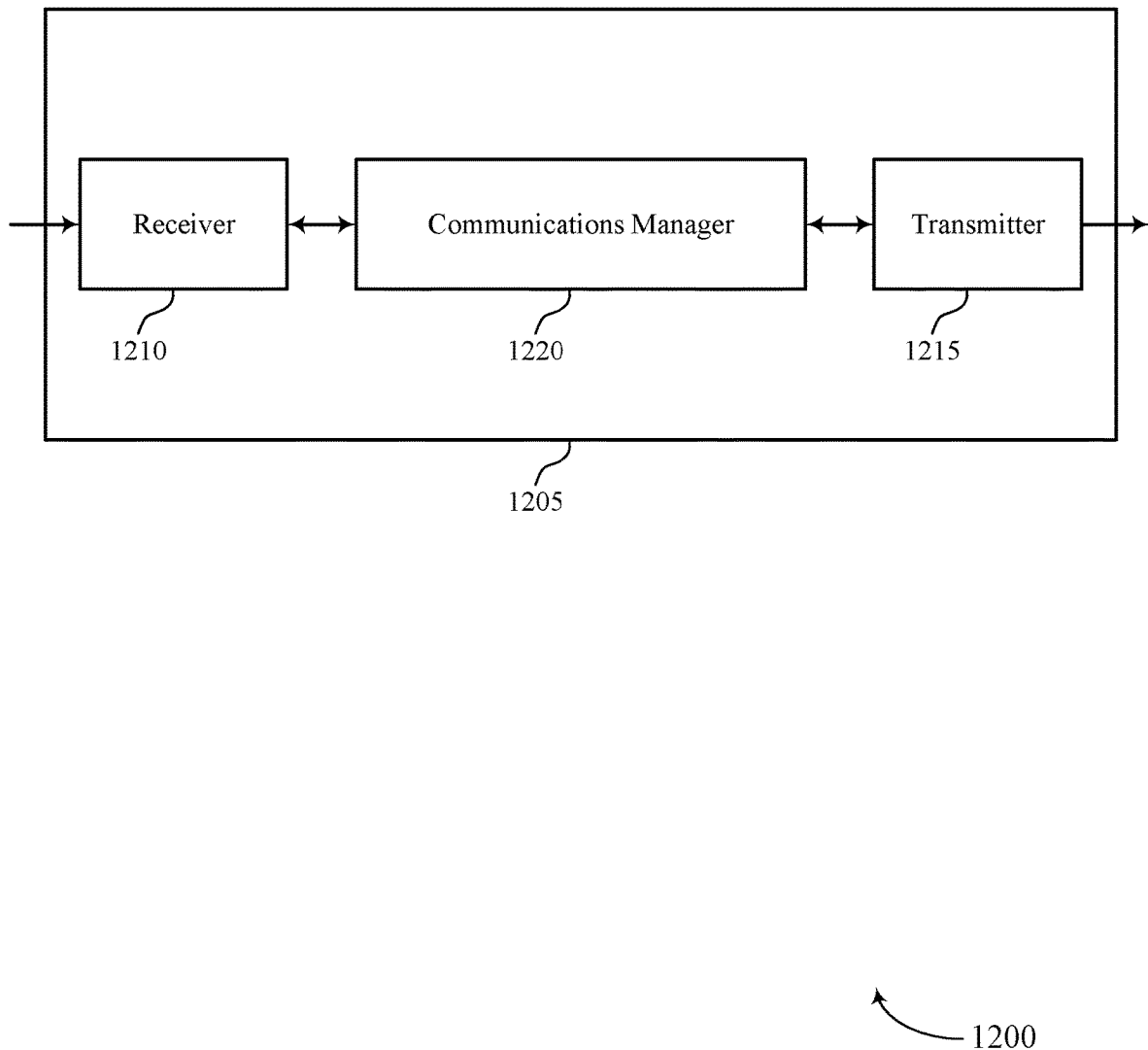
FIGS. 12 and 13 show block diagrams of devices that support reference signal patterns for beam management in accordance with aspects of the present disclosure.

FIG. 12 shows a block diagram 1200 of a device 1205 that supports reference signal patterns for beam management in accordance with aspects of the present disclosure. The device 1205 may be an example of aspects of a base station 105 as described herein. The device 1205 may include a receiver 1210, a transmitter 1215, and a communications manager 1220. The device 1205 may also include a processor. Each of these components may be in communication with one another (e.g., via one or more buses).

The receiver 1210 may provide a means for receiving information such as packets, user data, control information, or any combination thereof associated with various information channels (e.g., control channels, data channels, information channels related to reference signal patterns for beam management). Information may be passed on to other components of the device 1205. The receiver 1210 may utilize a single antenna or a set of multiple antennas.

The transmitter 1215 may provide a means for transmitting signals generated by other components of the device 1205. For example, the transmitter 1215 may transmit information such as packets, user data, control information, or any combination thereof associated with various information channels (e.g., control channels, data channels, information channels related to reference signal patterns for beam management). In some examples, the transmitter 1215 may be co-located with a receiver 1210 in a transceiver module. The transmitter 1215 may utilize a single antenna or a set of multiple antennas.

The communications manager 1220, the receiver 1210, the transmitter 1215, or various combinations thereof or various components thereof may be examples of means for performing various aspects of reference signal patterns for beam management as described herein. For example, the communications manager 1220, the receiver 1210, the transmitter 1215, or various combinations or components thereof may support a method for performing one or more of the functions described herein.

In some examples, the communications manager 1220, the receiver 1210, the transmitter 1215, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 1220, the receiver 1210, the transmitter 1215, or various combinations or components thereof may be implemented in code (e.g., as communications management software or firmware) executed by a processor. If implemented in code executed by a processor, the functions of the communications manager 1220, the receiver 1210, the transmitter 1215, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 1220 may be configured to perform various operations (e.g., receiving, monitoring, transmitting) using or otherwise in cooperation with the receiver 1210, the transmitter 1215, or both. For example, the communications manager 1220 may receive information from the receiver 1210, send information to the transmitter 1215, or be integrated in combination with the receiver 1210, the transmitter 1215, or both to receive information, transmit information, or perform various other operations as described herein.

The communications manager 1220 may support wireless communication at a base station in accordance with examples as disclosed herein. For example, the communications manager 1220 may be configured as or otherwise support a means for transmitting, to a UE, a control signal that indicates a SRS beam management configuration that identifies one or more SRS resource groups within a SRS resource set and a transmit beam pattern that indicates a respective transmit beam for each of the one or more SRS resource groups. The communications manager 1220 may be configured as or otherwise support a means for receiving one or more SRS each transmitted by the UE using a corresponding SRS resource of the SRS resource set and on a corresponding transmit beam based on a SRS resource group to which the corresponding sounding reference resource belongs, in accordance with the SRS beam management configuration. The communications manager 1220 may be configured as or otherwise support a means for transmitting, to the UE, an indication of a first transmit beam of the respective transmit beams that the UE is to use for uplink communications.

Figure 13:
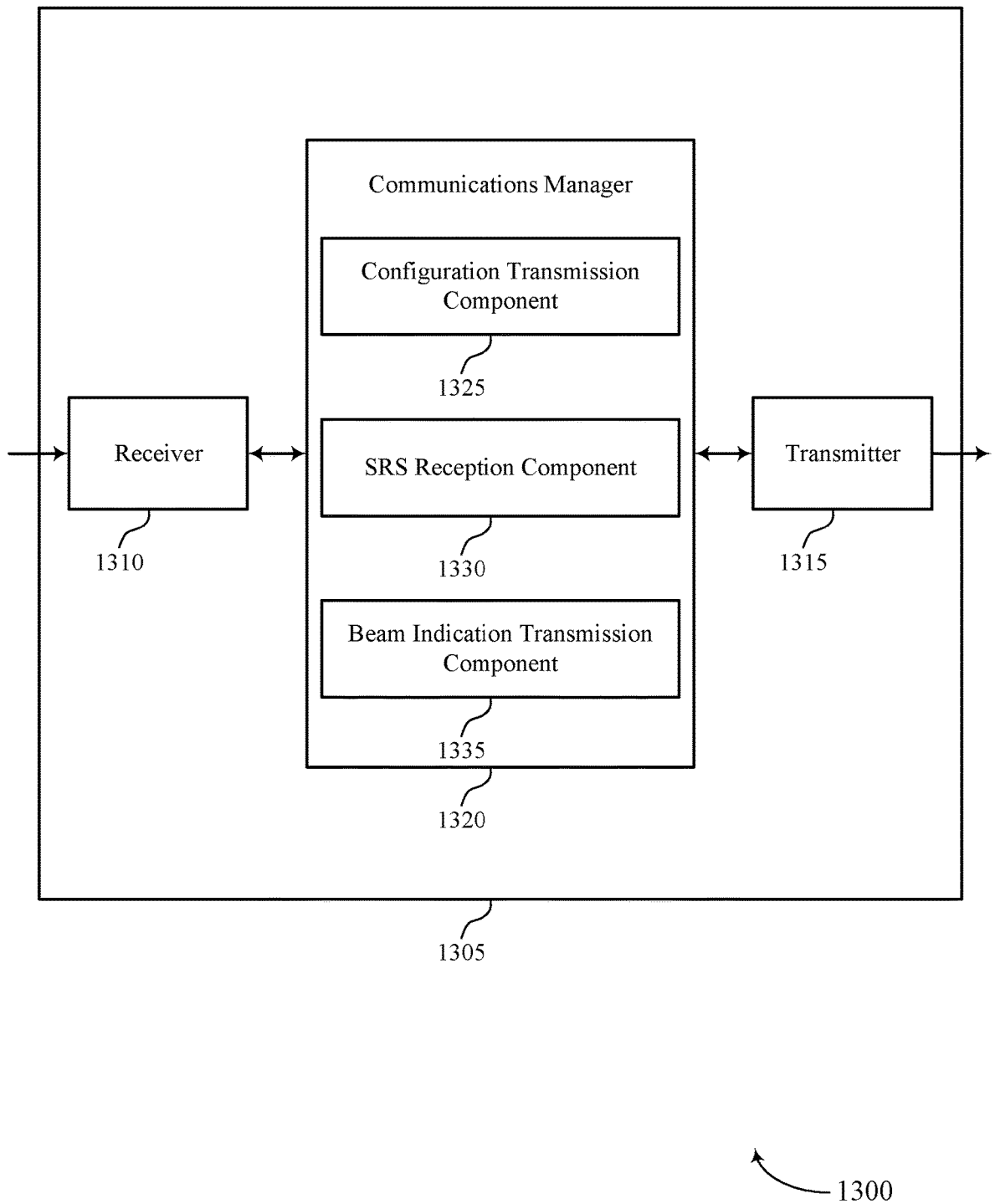

FIG. 13 shows a block diagram 1300 of a device 1305 that supports reference signal patterns for beam management in accordance with aspects of the present disclosure. The device 1305 may be an example of aspects of a device 1205 or a base station 105 as described herein. The device 1305 may include a receiver 1310, a transmitter 1315, and a communications manager 1320. The device 1305 may also include a processor. Each of these components may be in communication with one another (e.g., via one or more buses).

The receiver 1310 may provide a means for receiving information such as packets, user data, control information, or any combination thereof associated with various information channels (e.g., control channels, data channels, information channels related to reference signal patterns for beam management). Information may be passed on to other components of the device 1305. The receiver 1310 may utilize a single antenna or a set of multiple antennas.

The transmitter 1315 may provide a means for transmitting signals generated by other components of the device 1305. For example, the transmitter 1315 may transmit information such as packets, user data, control information, or any combination thereof associated with various information channels (e.g., control channels, data channels, information channels related to reference signal patterns for beam management). In some examples, the transmitter 1315 may be co-located with a receiver 1310 in a transceiver module. The transmitter 1315 may utilize a single antenna or a set of multiple antennas.

The device 1305, or various components thereof, may be an example of means for performing various aspects of reference signal patterns for beam management as described herein. For example, the communications manager 1320 may include a configuration transmission component 1325, an SRS reception component 1330, a beam indication transmission component 1335, or any combination thereof. The communications manager 1320 may be an example of aspects of a communications manager 1220 as described herein. In some examples, the communications manager 1320, or various components thereof, may be configured to perform various operations (e.g., receiving, monitoring, transmitting) using or otherwise in cooperation with the receiver 1310, the transmitter 1315, or both. For example, the communications manager 1320 may receive information from the receiver 1310, send information to the transmitter 1315, or be integrated in combination with the receiver 1310, the transmitter 1315, or both to receive information, transmit information, or perform various other operations as described herein.

The communications manager 1320 may support wireless communication at a base station in accordance with examples as disclosed herein. The configuration transmission component 1325 may be configured as or otherwise support a means for transmitting, to a UE, a control signal that indicates a SRS beam management configuration that identifies one or more SRS resource groups within a SRS resource set and a transmit beam pattern that indicates a respective transmit beam for each of the one or more SRS resource groups. The SRS reception component 1330 may be configured as or otherwise support a means for receiving one or more SRS each transmitted by the UE using a corresponding SRS resource of the SRS resource set and on a corresponding transmit beam based on a SRS resource group to which the corresponding sounding reference resource belongs, in accordance with the SRS beam management configuration. The beam indication transmission component 1335 may be configured as or otherwise support a means for transmitting, to the UE, an indication of a first transmit beam of the respective transmit beams that the UE is to use for uplink communications.

Figure 14:
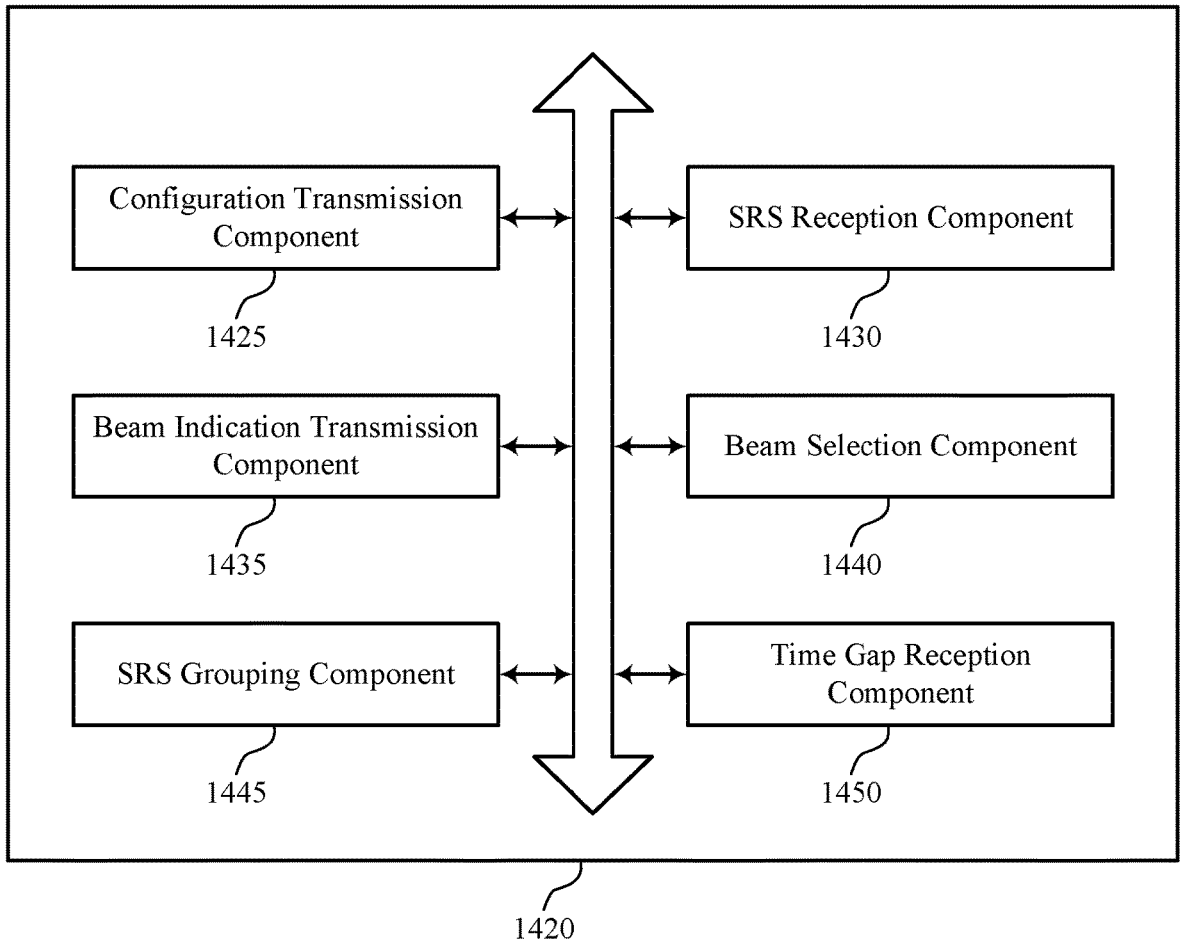
FIG. 14 shows a block diagram of a communications manager that supports reference signal patterns for beam management in accordance with aspects of the present disclosure.

FIG. 14 shows a block diagram 1400 of a communications manager 1420 that supports reference signal patterns for beam management in accordance with aspects of the present disclosure. The communications manager 1420 may be an example of aspects of a communications manager 1220, a communications manager 1320, or both, as described herein. The communications manager 1420, or various components thereof, may be an example of means for performing various aspects of reference signal patterns for beam management as described herein. For example, the communications manager 1420 may include a configuration transmission component 1425, an SRS reception component 1430, a beam indication transmission component 1435, a beam selection component 1440, an SRS grouping component 1445, a time gap reception component 1450, or any combination thereof. Each of these components may communicate, directly or indirectly, with one another (e.g., via one or more buses).

The communications manager 1420 may support wireless communication at a base station in accordance with examples as disclosed herein. The configuration transmission component 1425 may be configured as or otherwise support a means for transmitting, to a UE, a control signal that indicates a SRS beam management configuration that identifies one or more SRS resource groups within a SRS resource set and a transmit beam pattern that indicates a respective transmit beam for each of the one or more SRS resource groups. The SRS reception component 1430 may be configured as or otherwise support a means for receiving one or more SRS each transmitted by the UE using a corresponding SRS resource of the SRS resource set and on a corresponding transmit beam based on a SRS resource group to which the corresponding sounding reference resource belongs, in accordance with the SRS beam management configuration. The beam indication transmission component 1435 may be configured as or otherwise support a means for transmitting, to the UE, an indication of a first transmit beam of the respective transmit beams that the UE is to use for uplink communications.

In some examples, the SRS reception component 1430 may be configured as or otherwise support a means for configuring a respective receive beam for each SRS resource within a SRS resource group of the one or more SRS resource groups. In some examples, the beam selection component 1440 may be configured as or otherwise support a means for selecting a first receive beam of the respective receive beams to use for uplink communications with the UE based on receipt of the one or more SRS using the first receive beam. In some examples, the beam selection component 1440 may be configured as or otherwise support a means for selecting the first transmit beam based on a signal quality associated with the one or more SRS.

In some examples, to support transmitting the control signal that indicates the SRS beam management configuration, the configuration transmission component 1425 may be configured as or otherwise support a means for transmitting, via the control signal, an additional indication of a number of SRS resources in each of the one or more SRS resource groups, where the transmit beam pattern is based on the number of SRS resources in each of the one or more SRS resource groups. In some examples, to support transmitting the control signal that indicates the SRS beam management configuration, the configuration transmission component 1425 may be configured as or otherwise support a means for transmitting, via the control signal, an additional indication of a number of the one or more SRS resource groups for the SRS resource set, where the transmit beam pattern is based on the number of SRS resource groups.

In some examples, the SRS grouping component 1445 may be configured as or otherwise support a means for identifying the one or more SRS resource groups based on a time domain position of SRS resources of the SRS resource set and a number of SRS resources for each of the one or more SRS resource groups, where transmitting the control signal indicating the transmit beam pattern is based on identifying the one or more SRS resource groups. In some examples, the SRS grouping component 1445 may be configured as or otherwise support a means for identifying the one or more SRS resource groups based on an additional identifier of each SRS resource of the SRS resource set and a number of SRS resources for each of the one or more SRS resource groups, where transmitting the control signal indicating the transmit beam pattern is based on identifying the one or more SRS resource groups.

In some examples, to support transmitting the control signal that indicates the SRS beam management configuration, the configuration transmission component 1425 may be configured as or otherwise support a means for transmitting, via the control signal, an additional indication of a time gap between SRS resources within a same SRS resource group of the one or more SRS resource groups, where receiving the one or more SRS is based on the time gap. In some examples, the time gap reception component 1450 may be configured as or otherwise support a means for receiving an additional indication of a time gap between SRS resources within different SRS resource groups of the one or more SRS resource groups, where receiving the one or more SRS is based on the time gap.

In some examples, to support transmitting the control signal that indicates the SRS beam management configuration, the configuration transmission component 1425 may be configured as or otherwise support a means for transmitting, via the control signal, an additional indication of a power control adjustment state for the SRS resource set, where receiving the one or more SRS is based on the power control adjustment state. In some examples, to support transmitting the control signal that indicates the SRS beam management configuration, the configuration transmission component 1425 may be configured as or otherwise support a means for transmitting the control signal configuring the SRS resource set as a semi-persistent SRS resource set, the control signal including a field indicating whether the control signal includes spatial relationship information for the SRS resource set.

In some examples, to support transmitting the indication of the first transmit beam, the beam indication transmission component 1435 may be configured as or otherwise support a means for transmitting signaling indicative of a first SRS resource group of the one or more SRS resource groups, where the first SRS resource group is associated with the first transmit beam.

In some examples, to support receiving the one or more SRS, the SRS reception component 1430 may be configured as or otherwise support a means for receiving the one or more SRS via an uplink node or via a supplementary uplink carrier.

Figure 15:
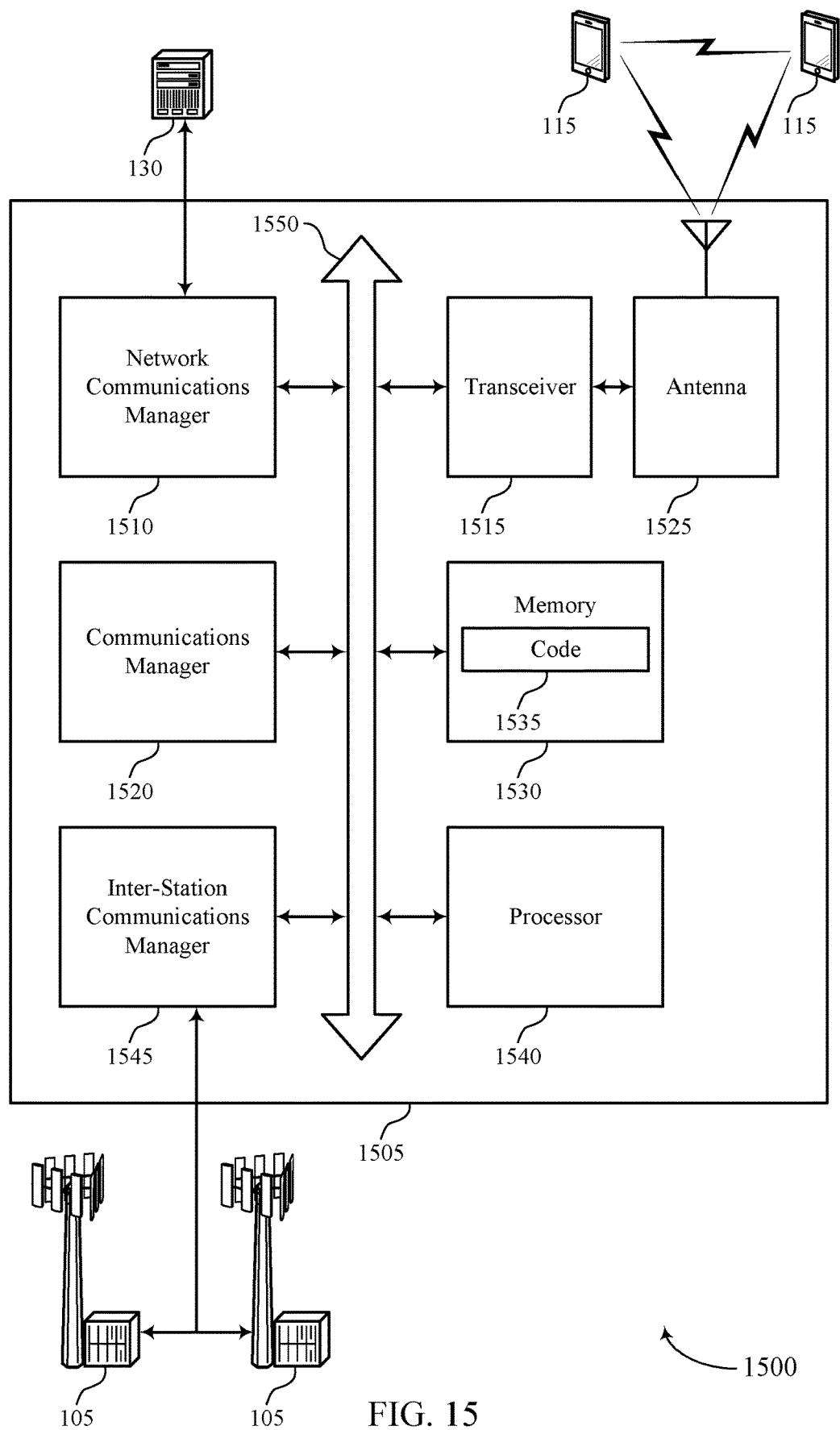
FIG. 15 shows a diagram of a system including a device that supports reference signal patterns for beam management in accordance with aspects of the present disclosure.

FIG. 15 shows a diagram of a system 1500 including a device 1505 that supports reference signal patterns for beam management in accordance with aspects of the present disclosure. The device 1505 may be an example of or include the components of a device 1205, a device 1305, or a base station 105 as described herein. The device 1505 may communicate wirelessly with one or more base stations 105, UEs 115, or any combination thereof. The device 1505 may include components for bi-directional voice and data communications including components for transmitting and receiving communications, such as a communications manager 1520, a network communications manager 1510, a transceiver 1515, an antenna 1525, a memory 1530, code 1535, a processor 1540, and an inter-station communications manager 1545. These components may be in electronic communication or otherwise coupled (e.g., operatively, communicatively, functionally, electronically, electrically) via one or more buses (e.g., a bus 1550).

The network communications manager 1510 may manage communications with a core network 130 (e.g., via one or more wired backhaul links). For example, the network communications manager 1510 may manage the transfer of data communications for client devices, such as one or more UEs 115.

In some cases, the device 1505 may include a single antenna 1525. However, in some other cases the device 1505 may have more than one antenna 1525, which may be capable of concurrently transmitting or receiving multiple wireless transmissions. The transceiver 1515 may communicate bi-directionally, via the one or more antennas 1525, wired, or wireless links as described herein. For example, the transceiver 1515 may represent a wireless transceiver and may communicate bi-directionally with another wireless transceiver. The transceiver 1515 may also include a modem to modulate the packets, to provide the modulated packets to one or more antennas 1525 for transmission, and to demodulate packets received from the one or more antennas 1525. The transceiver 1515, or the transceiver 1515 and one or more antennas 1525, may be an example of a transmitter 1215, a transmitter 1315, a receiver 1210, a receiver 1310, or any combination thereof or component thereof, as described herein.

The memory 1530 may include RAM and ROM. The memory 1530 may store computer-readable, computer-executable code 1535 including instructions that, when executed by the processor 1540, cause the device 1505 to perform various functions described herein. The code 1535 may be stored in a non-transitory computer-readable medium such as system memory or another type of memory. In some cases, the code 1535 may not be directly executable by the processor 1540 but may cause a computer (e.g., when compiled and executed) to perform functions described herein. In some cases, the memory 1530 may contain, among other things, a BIOS which may control basic hardware or software operation such as the interaction with peripheral components or devices.

The processor 1540 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1540 may be configured to operate a memory array using a memory controller. In some other cases, a memory controller may be integrated into the processor 1540. The processor 1540 may be configured to execute computer-readable instructions stored in a memory (e.g., the memory 1530) to cause the device 1505 to perform various functions (e.g., functions or tasks supporting reference signal patterns for beam management). For example, the device 1505 or a component of the device 1505 may include a processor 1540 and memory 1530 coupled to the processor 1540, the processor 1540 and memory 1530 configured to perform various functions described herein.

The inter-station communications manager 1545 may manage communications with other base stations 105, and may include a controller or scheduler for controlling communications with UEs 115 in cooperation with other base stations 105. For example, the inter-station communications manager 1545 may coordinate scheduling for transmissions to UEs 115 for various interference mitigation techniques such as beamforming or joint transmission. In some examples, the inter-station communications manager 1545 may provide an X2 interface within an LTE/LTE-A wireless communications network technology to provide communication between base stations 105.

The communications manager 1520 may support wireless communication at a base station in accordance with examples as disclosed herein. For example, the communications manager 1520 may be configured as or otherwise support a means for transmitting, to a UE, a control signal that indicates a SRS beam management configuration that identifies one or more SRS resource groups within a SRS resource set and a transmit beam pattern that indicates a respective transmit beam for each of the one or more SRS resource groups. The communications manager 1520 may be configured as or otherwise support a means for receiving one or more SRS each transmitted by the UE using a corresponding SRS resource of the SRS resource set and on a corresponding transmit beam based on a SRS resource group to which the corresponding sounding reference resource belongs, in accordance with the SRS beam management configuration. The communications manager 1520 may be configured as or otherwise support a means for transmitting, to the UE, an indication of a first transmit beam of the respective transmit beams that the UE is to use for uplink communications.

In some examples, the communications manager 1520 may be configured to perform various operations (e.g., receiving, monitoring, transmitting) using or otherwise in cooperation with the transceiver 1515, the one or more antennas 1525, or any combination thereof. Although the communications manager 1520 is illustrated as a separate component, in some examples, one or more functions described with reference to the communications manager 1520 may be supported by or performed by the processor 1540, the memory 1530, the code 1535, or any combination thereof. For example, the code 1535 may include instructions executable by the processor 1540 to cause the device 1505 to perform various aspects of reference signal patterns for beam management as described herein, or the processor 1540 and the memory 1530 may be otherwise configured to perform or support such operations.

Figure 16:
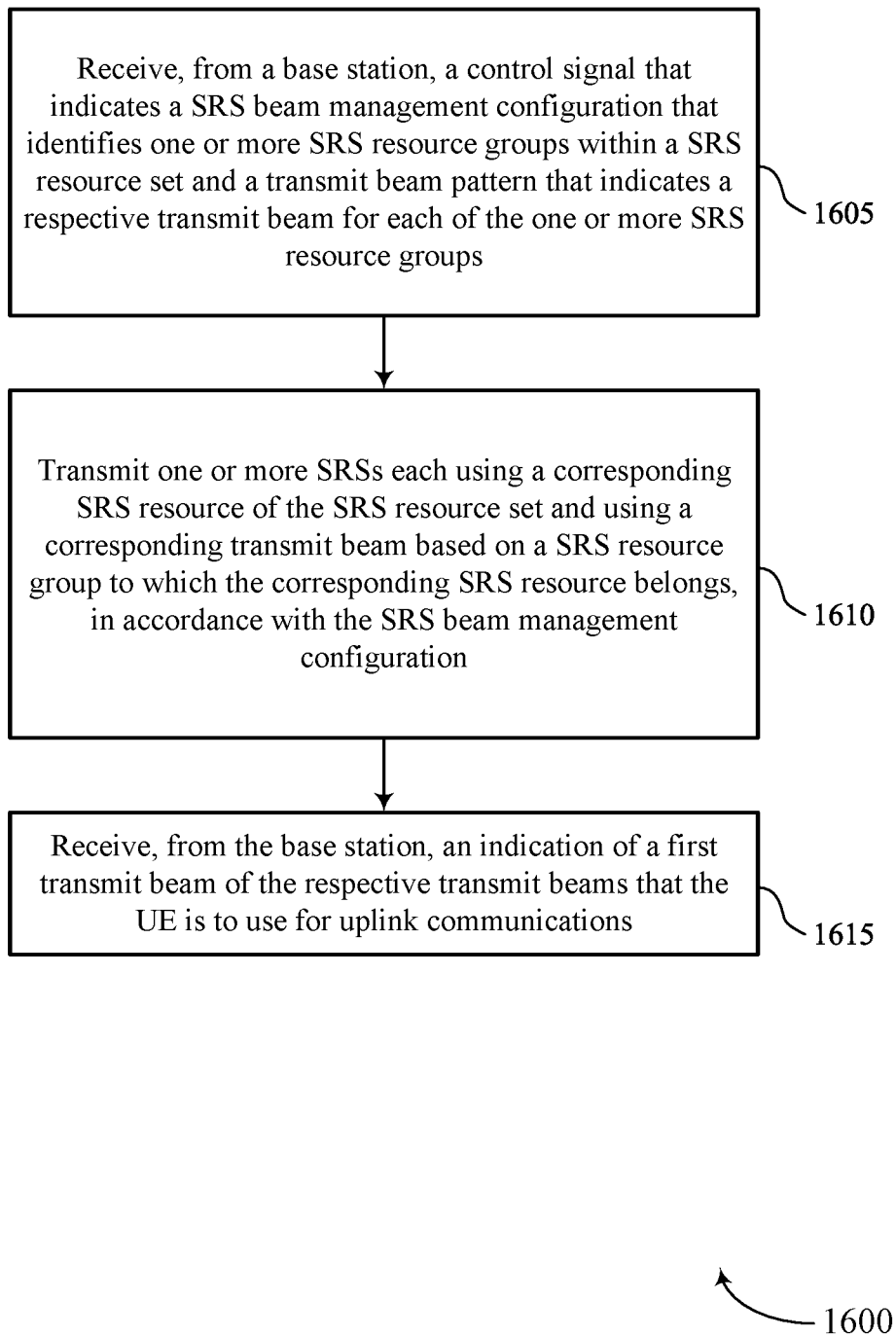
FIGS. 16 through 19 show flowcharts illustrating methods that support reference signal patterns for beam management in accordance with aspects of the present disclosure.

FIG. 16 shows a flowchart illustrating a method 1600 that supports reference signal patterns for beam management in accordance with aspects of the present disclosure. The operations of the method 1600 may be implemented by a UE or its components as described herein. For example, the operations of the method 1600 may be performed by a UE 115 as described with reference to FIGS. 1 through 11. In some examples, a UE may execute a set of instructions to control the functional elements of the UE to perform the described functions. Additionally or alternatively, the UE may perform aspects of the described functions using special-purpose hardware.

At 1605, the method may include receiving, from a base station, a control signal that indicates a SRS beam management configuration that identifies one or more SRS resource groups within a SRS resource set and a transmit beam pattern that indicates a respective transmit beam for each of the one or more SRS resource groups. The operations of 1605 may be performed in accordance with examples as disclosed herein. In some examples, aspects of the operations of 1605 may be performed by a configuration reception component 1025 as described with reference to FIG. 10.

At 1610, the method may include transmitting one or more SRS each using a corresponding SRS resource of the SRS resource set and using a corresponding transmit beam based on a SRS resource group to which the corresponding SRS resource belongs, in accordance with the SRS beam management configuration. The operations of 1610 may be performed in accordance with examples as disclosed herein. In some examples, aspects of the operations of 1610 may be performed by an SRS transmission component 1030 as described with reference to FIG. 10.

At 1615, the method may include receiving, from the base station, an indication of a first transmit beam of the respective transmit beams that the UE is to use for uplink communications. The operations of 1615 may be performed in accordance with examples as disclosed herein. In some examples, aspects of the operations of 1615 may be performed by a beam indication reception component 1035 as described with reference to FIG. 10.

Figure 17:
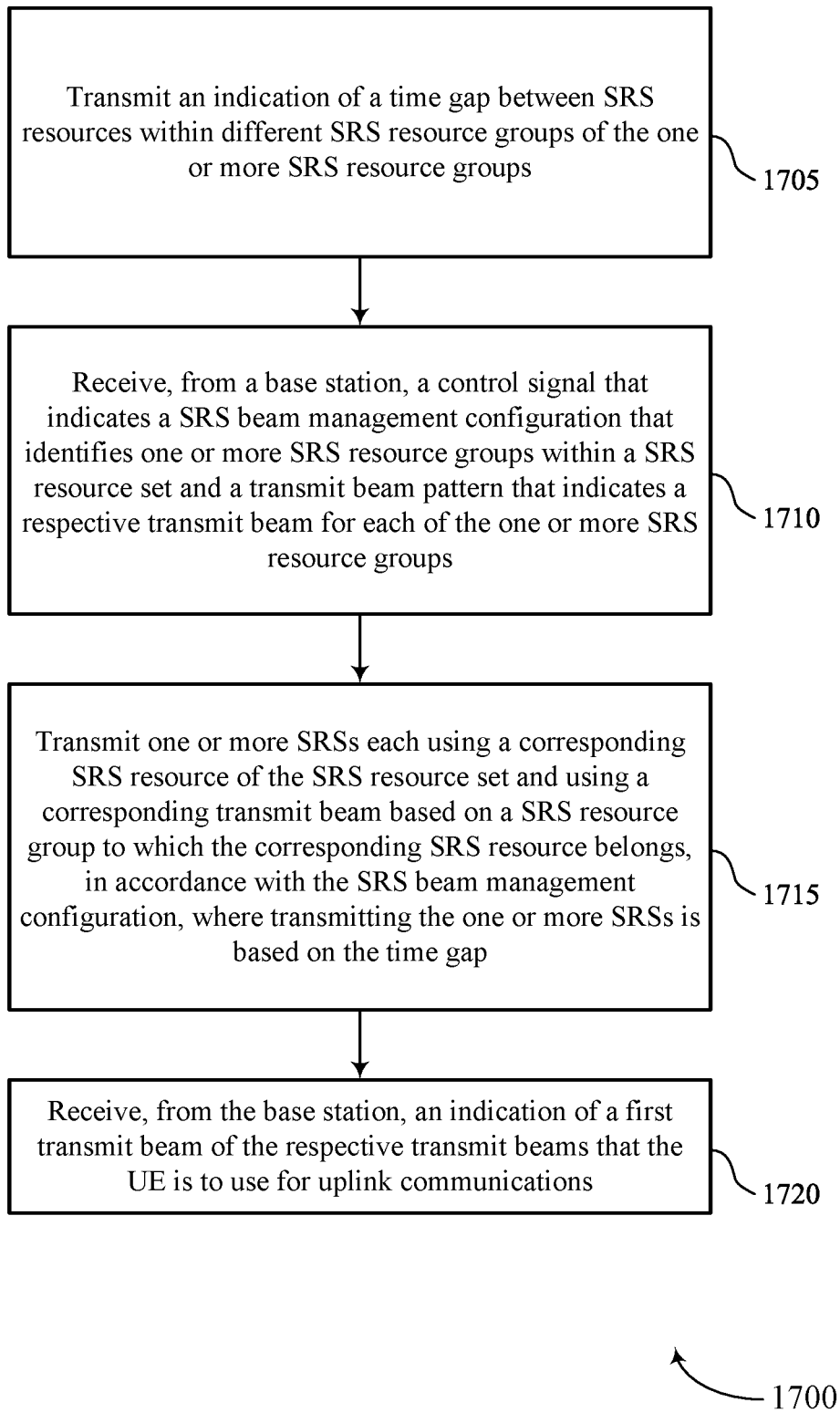

FIG. 17 shows a flowchart illustrating a method 1700 that supports reference signal patterns for beam management in accordance with aspects of the present disclosure. The operations of the method 1700 may be implemented by a UE or its components as described herein. For example, the operations of the method 1700 may be performed by a UE 115 as described with reference to FIGS. 1 through 11. In some examples, a UE may execute a set of instructions to control the functional elements of the UE to perform the described functions. Additionally or alternatively, the UE may perform aspects of the described functions using special-purpose hardware.

At 1705, the method may include transmitting an indication of a time gap between SRS resources within different SRS resource groups of one or more SRS resource groups. The operations of 1705 may be performed in accordance with examples as disclosed herein. In some examples, aspects of the operations of 1705 may be performed by a time gap indication component 1045 as described with reference to FIG. 10.

At 1710, the method may include receiving, from a base station, a control signal that indicates a SRS beam management configuration that identifies one or more SRS resource groups within a SRS resource set and a transmit beam pattern that indicates a respective transmit beam for each of the one or more SRS resource groups. The operations of 1710 may be performed in accordance with examples as disclosed herein. In some examples, aspects of the operations of 1710 may be performed by a configuration reception component 1025 as described with reference to FIG. 10.

At 1715, the method may include transmitting one or more SRS each using a corresponding SRS resource of the SRS resource set and using a corresponding transmit beam based on a SRS resource group to which the corresponding SRS resource belongs, in accordance with the SRS beam management configuration, where transmitting the one or more SRS is based on the time gap. The operations of 1715 may be performed in accordance with examples as disclosed herein. In some examples, aspects of the operations of 1715 may be performed by an SRS transmission component 1030 as described with reference to FIG. 10.

At 1720, the method may include receiving, from the base station, an indication of a first transmit beam of the respective transmit beams that the UE is to use for uplink communications. The operations of 1720 may be performed in accordance with examples as disclosed herein. In some examples, aspects of the operations of 1720 may be performed by a beam indication reception component 1035 as described with reference to FIG. 10.

Figure 18:
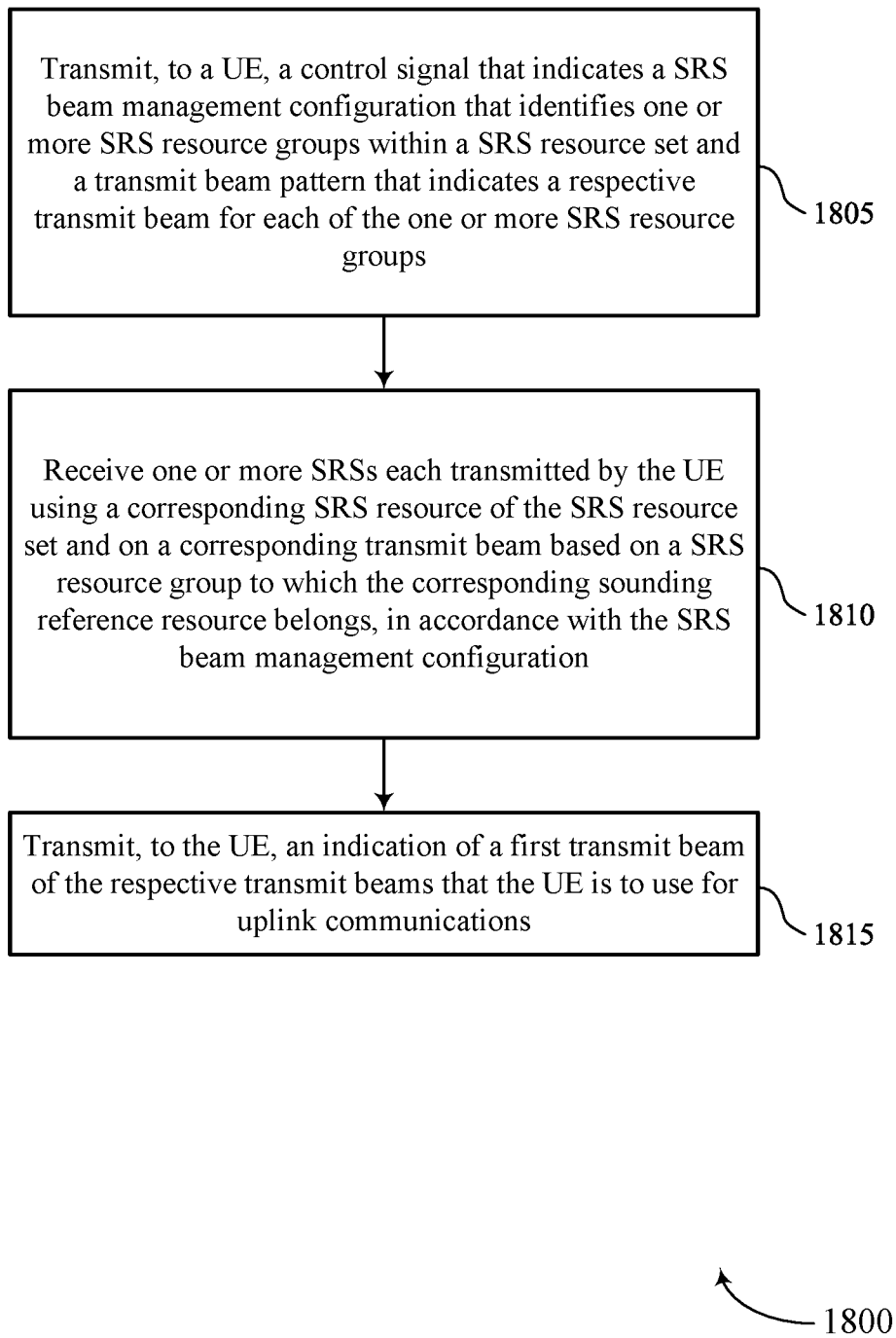

FIG. 18 shows a flowchart illustrating a method 1800 that supports reference signal patterns for beam management in accordance with aspects of the present disclosure. The operations of the method 1800 may be implemented by a base station or its components as described herein. For example, the operations of the method 1800 may be performed by a base station 105 as described with reference to FIGS. 1 through 7 and 12 through 15. In some examples, a base station may execute a set of instructions to control the functional elements of the base station to perform the described functions. Additionally or alternatively, the base station may perform aspects of the described functions using special-purpose hardware.

At 1805, the method may include transmitting, to a UE, a control signal that indicates a SRS beam management configuration that identifies one or more SRS resource groups within a SRS resource set and a transmit beam pattern that indicates a respective transmit beam for each of the one or more SRS resource groups. The operations of 1805 may be performed in accordance with examples as disclosed herein. In some examples, aspects of the operations of 1805 may be performed by a configuration transmission component 1425 as described with reference to FIG. 14.

At 1810, the method may include receiving one or more SRS each transmitted by the UE using a corresponding SRS resource of the SRS resource set and on a corresponding transmit beam based on a SRS resource group to which the corresponding sounding reference resource belongs, in accordance with the SRS beam management configuration. The operations of 1810 may be performed in accordance with examples as disclosed herein. In some examples, aspects of the operations of 1810 may be performed by an SRS reception component 1430 as described with reference to FIG. 14.

At 1815, the method may include transmitting, to the UE, an indication of a first transmit beam of the respective transmit beams that the UE is to use for uplink communications. The operations of 1815 may be performed in accordance with examples as disclosed herein. In some examples, aspects of the operations of 1815 may be performed by a beam indication transmission component 1435 as described with reference to FIG. 14.

Figure 19:
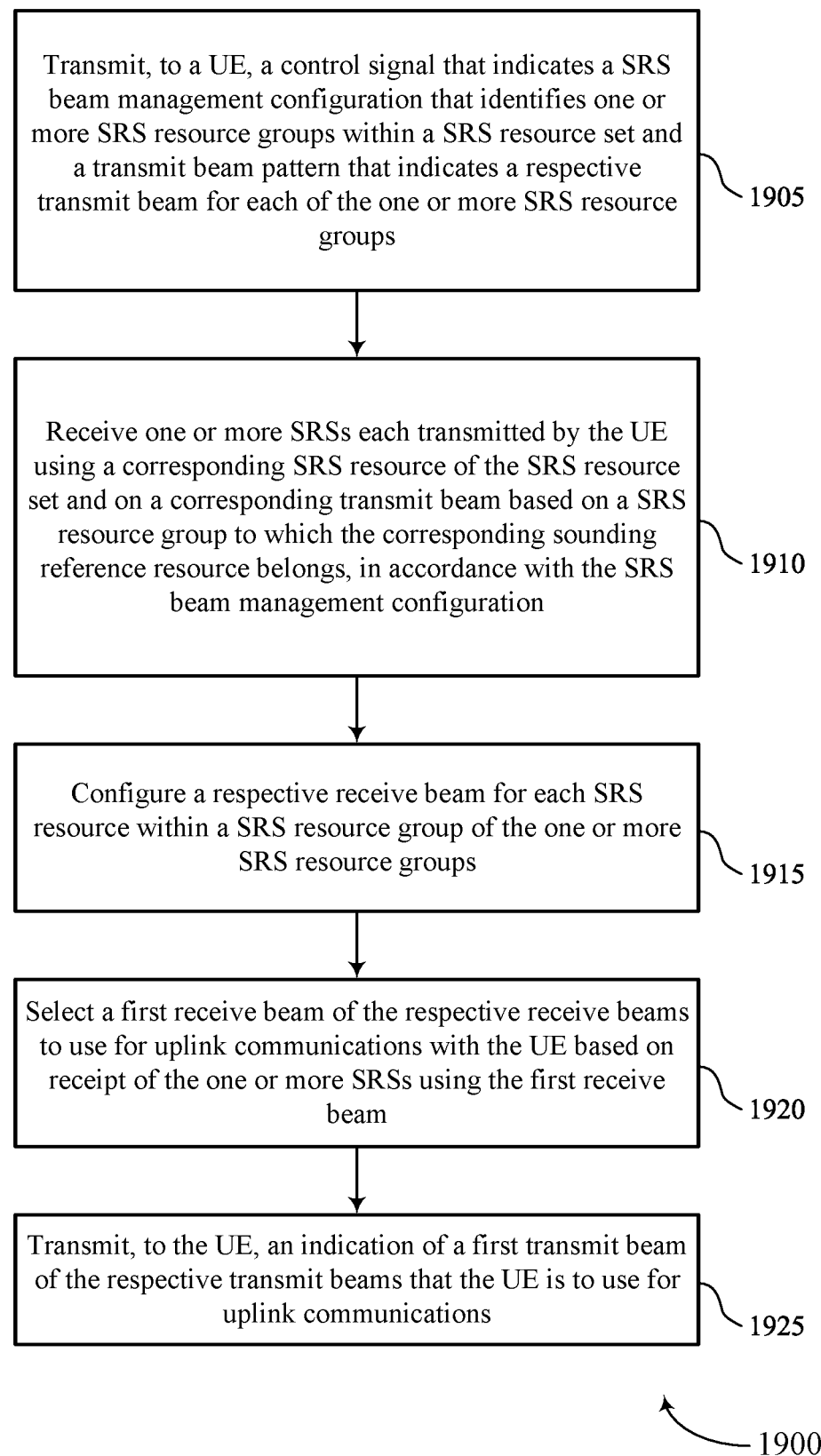

FIG. 19 shows a flowchart illustrating a method 1900 that supports reference signal patterns for beam management in accordance with aspects of the present disclosure. The operations of the method 1900 may be implemented by a base station or its components as described herein. For example, the operations of the method 1900 may be performed by a base station 105 as described with reference to FIGS. 1 through 7 and 12 through 15. In some examples, a base station may execute a set of instructions to control the functional elements of the base station to perform the described functions. Additionally or alternatively, the base station may perform aspects of the described functions using special-purpose hardware.

At 1905, the method may include transmitting, to a UE, a control signal that indicates a SRS beam management configuration that identifies one or more SRS resource groups within a SRS resource set and a transmit beam pattern that indicates a respective transmit beam for each of the one or more SRS resource groups. The operations of 1905 may be performed in accordance with examples as disclosed herein. In some examples, aspects of the operations of 1905 may be performed by a configuration transmission component 1425 as described with reference to FIG. 14.

At 1910, the method may include receiving one or more SRS each transmitted by the UE using a corresponding SRS resource of the SRS resource set and on a corresponding transmit beam based on a SRS resource group to which the corresponding sounding reference resource belongs, in accordance with the SRS beam management configuration. The operations of 1910 may be performed in accordance with examples as disclosed herein. In some examples, aspects of the operations of 1910 may be performed by an SRS reception component 1430 as described with reference to FIG. 14.

At 1915, the method may include configuring a respective receive beam for each SRS resource within a SRS resource group of the one or more SRS resource groups. The operations of 1915 may be performed in accordance with examples as disclosed herein. In some examples, aspects of the operations of 1915 may be performed by an SRS reception component 1430 as described with reference to FIG. 14.

At 1920, the method may include selecting a first receive beam of the respective receive beams to use for uplink communications with the UE based on receipt of the one or more SRS using the first receive beam. The operations of 1920 may be performed in accordance with examples as disclosed herein. In some examples, aspects of the operations of 1920 may be performed by a beam selection component 1440 as described with reference to FIG. 14.

At 1925, the method may include transmitting, to the UE, an indication of a first transmit beam of the respective transmit beams that the UE is to use for uplink communications. The operations of 1925 may be performed in accordance with examples as disclosed herein. In some examples, aspects of the operations of 1925 may be performed by a beam indication transmission component 1435 as described with reference to FIG. 14.

The following provides an overview of aspects of the present disclosure:

Aspect 1: A method for wireless communication at a UE, comprising: receiving, from a base station, a control signal that indicates an SRS beam management configuration that identifies one or more SRS resource groups within an SRS resource set and a transmit beam pattern that indicates a respective transmit beam for each of the one or more SRS resource groups; transmitting one or more SRS each using a corresponding SRS resource of the SRS resource set and using a corresponding transmit beam based on an SRS resource group to which the corresponding SRS resource belongs, in accordance with the SRS beam management configuration; and receiving, from the base station, an indication of a first transmit beam of the respective transmit beams that the UE is to use for uplink communications.

Aspect 2: The method of aspect 1, wherein receiving the control signal that indicates the SRS beam management configuration comprises: receiving, via the control signal, an additional indication of a number of SRS resources in each of the one or more SRS resource groups, wherein the transmit beam pattern is based at least in part on the number of SRS resources in each of the one or more SRS resource groups.

Aspect 3: The method of any of aspects 1 through 2, wherein receiving the control signal that indicates the SRS beam management configuration comprises: receiving, via the control signal, an additional indication of a number of the one or more SRS resource groups in the SRS resource set, wherein the transmit beam pattern is based at least in part on the number of the one or more SRS resource groups.

Aspect 4: The method of any of aspects 1 through 3, further comprising: identifying the one or more SRS resource groups based at least in part on a time domain position of SRS resources of the SRS resource set and a number of SRS resources for each of the one or more SRS resource groups, wherein the transmit beam pattern is based at least in part on identifying the one or more SRS resource groups.

Aspect 5: The method of any of aspects 1 through 3, further comprising: identifying the one or more SRS resource groups based at least in part on an additional ID of each SRS resource of the SRS resource set and a number of SRS resources for each of the one or more SRS resource groups, wherein the transmit beam pattern is based at least in part on identifying the one or more SRS resource groups.

Aspect 6: The method of any of aspects 1 through 5, wherein receiving the control signal that indicates the SRS beam management configuration comprises: receiving, via the control signal, an additional indication of a time gap between SRS resources within a same SRS resource group of the one or more SRS resource groups, wherein transmitting the one or more SRS is based at least in part on the time gap.

Aspect 7: The method of aspect 6, wherein transmitting the one or more SRS comprises: transmitting the one or more SRS each using the corresponding SRS resource within a first SRS resource group of the one or more SRS resource groups with at least the time gap between each of the SRS resources of the first SRS resource group.

Aspect 8: The method of any of aspects 1 through 7, further comprising: transmitting an additional indication of a time gap between SRS resources within different SRS resource groups of the one or more SRS resource groups, wherein transmitting the one or more SRS is based at least in part on the time gap.

Aspect 9: The method of aspect 8, wherein transmitting the one or more SRS comprises: transmitting a first SRS using a corresponding first SRS resource of a first SRS resource group of the one or more SRS resource groups; and transmitting a second SRS using a corresponding second SRS resource of a second SRS resource group of the one or more SRS resource groups with at least the time gap between the first SRS resource and the second SRS resource.

Aspect 10: The method of any of aspects 1 through 9, wherein transmitting the one or more SRS comprises: refraining from performing a power control adjustment between transmission of SRS using the corresponding SRS resources of the SRS resource set.

Aspect 11: The method of any of aspects 1 through 10, wherein receiving the control signal that indicates the SRS beam management configuration comprises: receiving, via the control signal, an additional indication of a power control adjustment state for the SRS resource set, wherein transmitting the one or more SRS is based at least in part on the power control adjustment state.

Aspect 12: The method of any of aspects 1 through 11, wherein receiving the control signal that indicates the SRS beam management configuration comprises: receiving the control signal configuring the SRS resource set as a semi-persistent SRS resource set, the control signal comprising a field indicating whether the control signal comprises spatial relationship information for the SRS resource set.

Aspect 13: The method of any of aspects 1 through 12, further comprising: transmitting the one or more SRS during a first period and based at least in part on the transmit beam pattern indicated by the SRS beam management configuration; and transmitting additional SRS during a second period using respective transmit beams that are based at least in part on the transmit beam pattern indicated by the SRS beam management configuration.

Aspect 14: The method of any of aspects 1 through 13, wherein receiving the indication of the first transmit beam comprises: receiving signaling indicative of a first SRS resource group of the one or more SRS resource groups, wherein the first SRS resource group is associated with the first transmit beam.

Aspect 15: The method of any of aspects 1 through 14, wherein transmitting the one or more SRS comprises: transmitting the one or more SRS towards an uplink node or via an SUL carrier.

Aspect 16: A method for wireless communication at a base station, comprising: transmitting, to a UE, a control signal that indicates an SRS beam management configuration that identifies one or more SRS resource groups within an SRS resource set and a transmit beam pattern that indicates a respective transmit beam for each of the one or more SRS resource groups; receiving one or more SRS each transmitted by the UE using a corresponding SRS resource of the SRS resource set and on a corresponding transmit beam based on an SRS resource group to which the corresponding sounding reference resource belongs, in accordance with the SRS beam management configuration; and transmitting, to the UE, an indication of a first transmit beam of the respective transmit beams that the UE is to use for uplink communications.

Aspect 17: The method of aspect 16, further comprising: configuring a respective receive beam for each SRS resource within an SRS resource group of the one or more SRS resource groups; and selecting a first receive beam of the respective receive beams to use for uplink communications with the UE based at least in part on receipt of the one or more SRS using the first receive beam.

Aspect 18: The method of any of aspects 16 through 17, further comprising: selecting the first transmit beam based at least in part on a signal quality associated with the one or more SRS.

Aspect 19: The method of any of aspects 16 through 18, wherein transmitting the control signal that indicates the SRS beam management configuration comprises: transmitting, via the control signal, an additional indication of a number of SRS resources in each of the one or more SRS resource groups, wherein the transmit beam pattern is based at least in part on the number of SRS resources in each of the one or more SRS resource groups.

Aspect 20: The method of any of aspects 16 through 19, wherein transmitting the control signal that indicates the SRS beam management configuration comprises: transmitting, via the control signal, an additional indication of a number of the one or more SRS resource groups for the SRS resource set, wherein the transmit beam pattern is based at least in part on the number of SRS resource groups.

Aspect 21: The method of any of aspects 16 through 20, further comprising: identifying the one or more SRS resource groups based at least in part on a time domain position of SRS resources of the SRS resource set and a number of SRS resources for each of the one or more SRS resource groups, wherein transmitting the control signal indicating the transmit beam pattern is based at least in part on identifying the one or more SRS resource groups.

Aspect 22: The method of any of aspects 16 through 20, further comprising: identifying the one or more SRS resource groups based at least in part on an additional ID of each SRS resource of the SRS resource set and a number of SRS resources for each of the one or more SRS resource groups, wherein transmitting the control signal indicating the transmit beam pattern is based at least in part on identifying the one or more SRS resource groups.

Aspect 23: The method of any of aspects 16 through 22, wherein transmitting the control signal that indicates the SRS beam management configuration comprises: transmitting, via the control signal, an additional indication of a time gap between SRS resources within a same SRS resource group of the one or more SRS resource groups, wherein receiving the one or more SRS is based at least in part on the time gap.

Aspect 24: The method of any of aspects 16 through 23, further comprising: receiving an additional indication of a time gap between SRS resources within different SRS resource groups of the one or more SRS resource groups, wherein receiving the one or more SRS is based at least in part on the time gap.

Aspect 25: The method of any of aspects 16 through 24, wherein transmitting the control signal that indicates the SRS beam management configuration comprises: transmitting, via the control signal, an additional indication of a power control adjustment state for the SRS resource set, wherein receiving the one or more SRS is based at least in part on the power control adjustment state.

Aspect 26: The method of any of aspects 16 through 25, wherein transmitting the control signal that indicates the SRS beam management configuration comprises: transmitting the control signal configuring the SRS resource set as a semi-persistent SRS resource set, the control signal comprising a field indicating whether the control signal comprises spatial relationship information for the SRS resource set.

Aspect 27: The method of any of aspects 16 through 26, wherein transmitting the indication of the first transmit beam comprises: transmitting signaling indicative of a first SRS resource group of the one or more SRS resource groups, wherein the first SRS resource group is associated with the first transmit beam.

Aspect 28: The method of any of aspects 16 through 27, wherein receiving the one or more SRS comprises: receiving the one or more SRS via an uplink node or via a SUL carrier.

Aspect 29: An apparatus for wireless communication at a UE, comprising a processor; memory coupled with the processor; and instructions stored in the memory and executable by the processor to cause the apparatus to perform a method of any of aspects 1 through 15.

Aspect 30: An apparatus for wireless communication at a UE, comprising at least one means for performing a method of any of aspects 1 through 15.

Aspect 31: A non-transitory computer-readable medium storing code for wireless communication at a UE, the code comprising instructions executable by a processor to perform a method of any of aspects 1 through 15.

Aspect 32: An apparatus for wireless communication at a base station, comprising a processor; memory coupled with the processor; and instructions stored in the memory and executable by the processor to cause the apparatus to perform a method of any of aspects 16 through 28.

Aspect 33: An apparatus for wireless communication at a base station, comprising at least one means for performing a method of any of aspects 16 through 28.

Aspect 34: A non-transitory computer-readable medium storing code for wireless communication at a base station, the code comprising instructions executable by a processor to perform a method of any of aspects 16 through 28.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus for wireless communications, comprising:
    at least one processor,
    at least one memory comprising instructions executable by the at least one processor to cause the apparatus to:
    obtain control signaling that indicates:
        a sounding reference signal beam management configuration that identifies, from a sounding reference signal resource set that has a plurality of sounding reference signal resources, one or more sounding reference signal resource groups, each group having a respective subset of one or more sounding reference signal resources of the plurality of sounding reference signal resources, and
        a transmit beam pattern that indicates a respective transmit beam for each of the one or more sounding reference signal resource groups identified by the sounding reference signal beam management configuration, wherein, for each sounding reference signal resource group, the respective subset of one or more sounding reference signal resources in that sounding reference signal resource group is identified based at least in part on the time domain positions of the plurality of sounding reference signal resources, and wherein a time gap between sounding reference signal resource groups is based at least in part on an indication of a time gap value output by the apparatus;

output, in accordance with the sounding reference signal beam management configuration and the time gap, each of one or more sounding reference signals for transmission via a corresponding sounding reference signal resource of the sounding reference signal resource set and via a corresponding transmit beam associated with the transmit beam pattern; and obtain an indication of a transmit beam associated with the transmit beam pattern that the apparatus is to use.

2. The apparatus of claim 1, wherein the control signaling further indicates a quantity of one or more sounding reference signal resources in each sounding reference signal resource group.

3. The apparatus of claim 1, wherein the control signaling further indicates a quantity of the one or more sounding reference signal resource groups, wherein the transmit beam pattern is based at least in part on the quantity of the one or more sounding reference signal resource groups.

4. The apparatus of claim 1, wherein the instructions are further executable by the at least one processor to cause the apparatus to:

identify the one or more sounding reference signal resource groups based at least in part on a quantity of sounding reference signal resources per sounding reference signal resource group.

5. The apparatus of claim 1, wherein the instructions are further executable by the at least one processor to cause the apparatus to:

identify the one or more sounding reference signal resource groups based at least in part on an additional identifier of each sounding reference signal resource of the sounding reference signal resource set and a quantity of one or more sounding reference signal resources per sounding reference signal resource group.

6. The apparatus of claim 1, wherein the control signaling further indicates a second time gap between sounding reference signal resources within a same sounding reference signal resource group of the one or more sounding reference signal resource groups, wherein outputting each of the one or more sounding reference signals is based at least in part on the second time gap.

7. The apparatus of claim 6, wherein the instructions to output each of the one or more sounding reference signals are further executable by the at least one processor to cause the apparatus to:

output each of the one or more sounding reference signals for transmission via the corresponding sounding reference signal resource within a first sounding reference signal resource group of the one or more sounding reference signal resource groups with at least the time gap between each of the sounding reference signal resources of the first sounding reference signal resource group.

8. The apparatus of claim 1, wherein the instructions to output each of the one or more sounding reference signals are further executable by the at least one processor to cause the apparatus to:

output a first sounding reference signal for transmission via a corresponding first sounding reference signal resource of a first sounding reference signal resource group of the one or more sounding reference signal resource groups; and output a second sounding reference signal for transmission via a corresponding second sounding reference signal resource of a second sounding reference signal resource group of the one or more sounding reference signal resource groups with at least the time gap between the first sounding reference signal resource group and the second sounding reference signal resource group.

9. The apparatus of claim 1, wherein the instructions to output each of the one or more sounding reference signals are further executable by the at least one processor to cause the apparatus to:

refrain from performing a power control adjustment between transmissions of sounding reference signals via the corresponding plurality of sounding reference signal resources of the sounding reference signal resource set.

10. The apparatus of claim 1, wherein the control signaling further indicates a power control adjustment state for the sounding reference signal resource set, wherein outputting each of the one or more sounding reference signals is based at least in part on the power control adjustment state.

11. The apparatus of claim 1, wherein the control signaling configures the sounding reference signal resource set as a semi-persistent sounding reference signal resource set, wherein the control signaling comprises a field indicating whether the control signaling comprises spatial relationship information for the sounding reference signal resource set, or both.

12. The apparatus of claim 1, wherein the instructions are further executable by the at least one processor to cause the apparatus to:

output, for transmission, each of the one or more sounding reference signals during a first period and based at least in part on the transmit beam pattern indicated by the sounding reference signal beam management configuration; and output, for transmission via respective transmit beams that are based at least in part on the transmit beam pattern indicated by the sounding reference signal beam management configuration, additional sounding reference signals during a second period.

13. The apparatus of claim 1, wherein the instructions to obtain the indication of the transmit beam are further executable by the at least one processor to cause the apparatus to:

obtain signaling indicative of a first sounding reference signal resource group of the one or more sounding reference signal resource groups, wherein the first sounding reference signal resource group is associated with the transmit beam.

14. The apparatus of claim 1, wherein the indication of the transmit beam is obtained from a network device, and wherein the instructions to output each of the one or more sounding reference signals are further executable by the at least one processor to cause the apparatus to:

output, for transmission towards a node different from the network device or towards the network device via a supplementary uplink (SUL) carrier, each of the one or more sounding reference signals.

15. The apparatus of claim 1, further comprising an antenna via which the control signaling and the indication are obtained and via which each of the one or more sounding reference signals are outputted for transmission, wherein the apparatus is configured as a user equipment.

16. An apparatus for wireless communications, comprising:

at least one processor; and at least one memory comprising instructions executable by the at least one processor to cause the apparatus to:

output control signaling that indicates:

a sounding reference signal beam management configuration that identifies, from a sounding reference signal resource set that has a plurality of sounding reference signal resources, one or more sounding reference signal resource groups, each group having a respective subset of one or more sounding reference signal resources of the plurality of sounding reference signal resources, and a transmit beam pattern that indicates a respective transmit beam for each of the one or more sounding reference signal resource groups identified by the sounding reference signal beam management configuration, wherein, for each sounding reference signal resource group, the respective subset of one or more sounding reference signal resources in that sounding reference signal resource group is identified based at least in part on the time domain positions of the plurality of sounding reference signal resources, and wherein a time gap between sounding reference signal resource groups is based at least in part on an indication of a time gap value obtained from the apparatus;

obtain, in accordance with the sounding reference signal beam management configuration and the time gap, each of one or more sounding reference signals via a corresponding sounding reference signal resource of the sounding reference signal resource set and via a corresponding transmit beam of the transmit beam pattern; and output an indication of a transmit beam associated with the transmit beam pattern that a user equipment (UE) is to use.

17. The apparatus of claim 16, wherein the instructions are further executable by the at least one processor to cause the apparatus to:

configure a respective receive beam for each sounding reference signal resource within a sounding reference signal resource group of the one or more sounding reference signal resource groups; and select a first receive beam of the respective receive beams to use for uplink communications with the UE based at least in part on receipt of the one or more sounding reference signals via the first receive beam.

18. The apparatus of claim 16, wherein the instructions are further executable by the at least one processor to cause the apparatus to:

select the transmit beam based at least in part on a signal quality associated with the one or more sounding reference signals.

19. The apparatus of claim 16, wherein the control signaling further indicates a quantity of one or more sounding reference signal resources per sounding reference signal resource group.

20. The apparatus of claim 16, wherein the control signaling further indicates a quantity of the one or more sounding reference signal resource groups, wherein the transmit beam pattern is based at least in part on the quantity of sounding reference signal resource groups.

21. The apparatus of claim 16, wherein the instructions are further executable by the at least one processor to cause the apparatus to:

identify the one or more sounding reference signal resource groups based at least in part on a quantity of sounding reference signal resources per sounding reference signal resource group.

22. The apparatus of claim 16, wherein the instructions are further executable by the at least one processor to cause the apparatus to:

identify the one or more sounding reference signal resource groups based at least in part on an additional identifier of each sounding reference signal resource of the sounding reference signal resource set and a quantity of one or more sounding reference signal resources per sounding reference signal resource group.

23. The apparatus of claim 16, wherein the control signaling further indicates a second time gap between sounding reference signal resources within a same sounding reference signal resource group of the one or more sounding reference signal resource groups, wherein obtaining each of the one or more sounding reference signals is based at least in part on the second time gap.

24. The apparatus of claim 16, wherein the control signaling further indicates a power control adjustment state for the sounding reference signal resource set, wherein obtaining each of the one or more sounding reference signals is based at least in part on the power control adjustment state.

25. The apparatus of claim 16, wherein the control signaling configures the sounding reference signal resource set as a semi-persistent sounding reference signal resource set, wherein the control signaling comprises a field indicating whether the control signaling comprises spatial relationship information for the sounding reference signal resource set, or both.

26. The apparatus of claim 16, wherein the instructions to output the indication of the transmit beam are further executable by the at least one processor to cause the apparatus to:

output, for transmission, signaling indicative of a first sounding reference signal resource group of the one or more sounding reference signal resource groups, wherein the first sounding reference signal resource group is associated with the transmit beam.

27. The apparatus of claim 16, wherein the instructions to obtain each of the one or more sounding reference signals are further executable by the at least one processor to cause the apparatus to:

obtain, from an uplink node different from the UE or from the UE via a supplementary uplink (SUL) carrier, each of the one or more sounding reference signals.

28. The apparatus of claim 16, further comprising an antenna via which the control signaling and the indication are outputted for transmission and via which each of the one or more sounding reference signals are obtained for transmission, wherein the apparatus is configured as a network device.

29. A method for wireless communication at a user equipment (UE), comprising:

receiving control signaling that indicates:

a sounding reference signal beam management configuration that identifies, from a sounding reference signal resource set that has a plurality of sounding reference signal resources, one or more sounding reference signal resource groups, each group having a respective subset of one or more sounding reference signal resources of the plurality of sounding reference signal resources, and a transmit beam pattern that indicates a respective transmit beam for each of the one or more sounding reference signal resource groups identified by the sounding reference signal beam management configuration, wherein, for each sounding reference signal resource group, the respective subset of one or more sounding reference signal resources in that sounding reference signal resource group is identified based at least in part on the time domain positions of the plurality of sounding reference signal resources, and wherein a time gap between sounding reference signal resource groups is based at least in part on an indication of a time gap value output by the UE;

transmitting, in accordance with the sounding reference signal beam management configuration and the time gap, each of one or more sounding reference signals for transmission via a corresponding sounding reference signal resource of the sounding reference signal resource set and via a corresponding transmit beam associated with the transmit beam pattern; and receiving an indication of a transmit beam that the UE is to use.

30. A method for wireless communication at a network device, comprising:

transmitting control signaling that indicates:

a sounding reference signal beam management configuration that identifies, from a sounding reference signal resource set that has a plurality of sounding reference signal resources, one or more sounding reference signal resource groups, each group having a respective subset of one or more sounding reference signal resources of the plurality of sounding reference signal resources, and a transmit beam pattern that indicates a respective transmit beam for each of the one or more sounding reference signal resource groups identified by the sounding reference signal beam management configuration, wherein, for each sounding reference signal resource group, the respective subset of one or more sounding reference signal resources in that sounding reference signal resource group is identified based at least in part on the time domain positions of the plurality of sounding reference signal resources, and wherein a time gap between sounding reference signal resource groups is based at least in part on an indication of a time gap value obtained from a user equipment (UE);

receiving, in accordance with the sounding reference signal beam management configuration and the time gap, each of one or more sounding reference signals via a corresponding sounding reference signal resource of the sounding reference signal resource set and via a corresponding transmit beam of the transmit beam pattern; and transmitting an indication of a transmit beam associated with the transmit beam pattern that the UE is to use.

\* \* \* \* \*